United States Patent
Ouchi et al.

(10) Patent No.: US 10,542,564 B2
(45) Date of Patent: Jan. 21, 2020

(54) TERMINAL DEVICE AND METHOD

(71) Applicant: SHARP KABUSHIKI KAISHA, Sakai, Osaka (JP)

(72) Inventors: Wataru Ouchi, Sakai (JP); Kazuyuki Shimezawa, Sakai (JP); Naoki Kusashima, Sakai (JP); Shoichi Suzuki, Sakai (JP); Takashi Hayashi, Sakai (JP); Kazunari Yokomakura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/748,158

(22) PCT Filed: Jul. 27, 2016

(86) PCT No.: PCT/JP2016/072008
§ 371 (c)(1),
(2) Date: Jan. 26, 2018

(87) PCT Pub. No.: WO2017/018446
PCT Pub. Date: Feb. 2, 2017

(65) Prior Publication Data
US 2018/0220458 A1    Aug. 2, 2018

(30) Foreign Application Priority Data
Jul. 28, 2015    (JP) ................. 2015-148651

(51) Int. Cl.
*H04W 74/08*    (2009.01)
*H04J 11/00*    (2006.01)
(Continued)

(52) U.S. Cl.
CPC ......... *H04W 74/0808* (2013.01); *H04J 11/00* (2013.01); *H04L 27/01* (2013.01);
(Continued)

(58) Field of Classification Search
CPC ......... H04J 11/00; H04L 27/01; H04W 16/14; H04W 24/10; H04W 72/04; H04W 74/0808
See application file for complete search history.

(56) References Cited

U.S. PATENT DOCUMENTS

2008/0285514 A1*   11/2008   Uchida .................. H04L 47/10
                                                                  370/329
2013/0252620 A1    9/2013   Kobayashi et al.
(Continued)

FOREIGN PATENT DOCUMENTS

| CN | 103262595 A | 8/2013 |
|---|---|---|
| CN | 104509154 A | 4/2015 |
| JP | 2015-130644 A | 7/2015 |

OTHER PUBLICATIONS

RRM Measurements for LAA; May 25-29, 2015; R2-152480; Ericsson; 3GPP TSG-RAN WG2 Meeting #90 Fukuoka, Japan.
(Continued)

*Primary Examiner* — Kashif Siddiqui
(74) *Attorney, Agent, or Firm* — ScienBiziP, P.C.

(57) ABSTRACT

A terminal device including a reception unit configured to receive higher layer signalling including a first configuration relating to measurement of a Received Signal Strength Indicator (RSSI) and a second configuration relating to reporting of the RSSI, a measurement unit configured to measure the RSSI and/or a channel occupancy; and a transmission unit configured to report a measurement result for the RSSI and/or the channel occupancy. The measurement result for the RSSI is an average of measurement results obtained in a first period, and
   the channel occupancy is obtained based on the measurement results equal to or greater than a first threshold among the measurement results obtained in the first period.

6 Claims, 5 Drawing Sheets

(51) Int. Cl.
  *H04L 27/01*    (2006.01)
  *H04W 24/10*   (2009.01)
  *H04W 72/04*   (2009.01)
  *H04W 16/14*   (2009.01)

(52) U.S. Cl.
  CPC ........... *H04W 16/14* (2013.01); *H04W 24/10* (2013.01); *H04W 72/04* (2013.01)

(56) References Cited

U.S. PATENT DOCUMENTS

| | | | |
|---|---|---|---|
| 2015/0172940 A1 | 6/2015 | Nagata et al. | |
| 2015/0312817 A1* | 10/2015 | Huang | H04W 36/0094 370/332 |
| 2016/0066195 A1* | 3/2016 | Moon | H04W 16/14 455/454 |
| 2016/0227427 A1* | 8/2016 | Vajapeyam | H04W 72/085 |
| 2017/0026889 A1 | 1/2017 | Tsuda et al. | |

OTHER PUBLICATIONS

Considerations on RRM measurements for LAA-LTE; May 25-29, 2015; R2-152708; Qualcomm Incorporated; 3GPP TSG-RAN WG2 Meeting #90bis Fukuoka, Japan.

* cited by examiner

TERMINAL DEVICE AND METHOD

TECHNICAL FIELD

Embodiments of the present invention relate to a technique for a terminal device and a method that realize efficient communications.

This application claims priority based on JP 2015-148651 filed on Jul. 28, 2015, the contents of which are incorporated herein by reference.

BACKGROUND ART

The 3rd General Partnership Project (3GPP), which is a standardization project, has standardized the Evolved Universal Terrestrial Radio Access (EUTRA), in which high-speed communication is realized by adopting an Orthogonal Frequency Division Multiplexing (OFDM) communication scheme and flexible scheduling in a unit of prescribed frequency and time called a resource block. The overall communications that have employed the standardized EUTRA technology may be referred to as "Long Term Evolution (LTE) communications".

Moreover, the 3GPP discusses the Advanced EUTRA (A-EUTRA), which realizes higher-speed data transmission and has upper compatibility with the EUTRA. The EUTRA relates to a communication system based on a network in which base station devices have substantially the identical cell configuration (cell size); however, regarding the A-EUTRA, discussion is made on a communication system based on a network (heterogeneous wireless network, heterogeneous network) in which base station devices (cells) having different configurations coexist in the same area.

The 3GPP discusses Licensed Assisted Access (LAA) communications that enable communication in an unlicensed frequency (unlicensed band) using a licensed frequency (licensed band) specified in the LTE (NPL 1).

NPL 1 discusses a method for measuring a Received Signal Strength Indicator (RSSI) relating to interference and noise to perform effective communication.

CITATION LIST

Non-Patent Document

[NON-PATENT DOCUMENT 1] NPL 1: R2-152480, Ericsson, 3GPP TSG RAN WG2 Meeting #90, 25-29 May 2015

DISCLOSURE OF THE INVENTION

Problems to be Solved by the Invention

A communication device (terminal device and/or base station device) may not be able to perform efficient communication simply by using measuring and reporting methods in the related art.

One embodiment of the present invention is to provide a cooking heater which is provided with both a drawing body and a rotating tray to allow the rotating tray to be cleaned easily.

Means for Solving the Problems (1) In order to accomplish the above-described object, some aspects of the present invention are contrived to provide the following means. In other words, a terminal device according to an aspect of the present invention includes a reception unit configured to receive higher layer signalling including a first configuration relating to measurement of a Received Signal Strength Indicator (RSSI) and a second configuration relating to reporting of the RSSI; a measurement unit configured to measure the RSSI and/or a channel occupancy; and a transmission unit configured to report a measurement result for the RSSI and/or the channel occupancy. The measurement result for the RSSI is an average of measurement results obtained in a first period, and the channel occupancy is obtained based on the measurement results equal to or greater than a first threshold among the measurement results obtained in the first period.

(2) Moreover, a method according to an aspect of the present invention includes the steps of: receiving higher layer signalling including a first configuration relating to measurement of a Received Signal Strength Indicator (RSSI) and a second configuration relating to reporting of the RSSI; measuring the RSSI and/or a channel occupancy; and reporting a measurement result for the RSSI and/or the channel occupancy. The measurement result for the RSSI is an average of measurement results obtained in a first period, and the channel occupancy is obtained based on the measurement results equal to or greater than a first threshold among the measurement results obtained in the first period.

Effects of the Invention

According to some aspects of the present invention, it is possible to improve transmission efficiency in a radio communication system in which a base station device and a terminal device communicate.

MODE FOR CARRYING OUT THE INVENTION

First Embodiment

Figure 1:
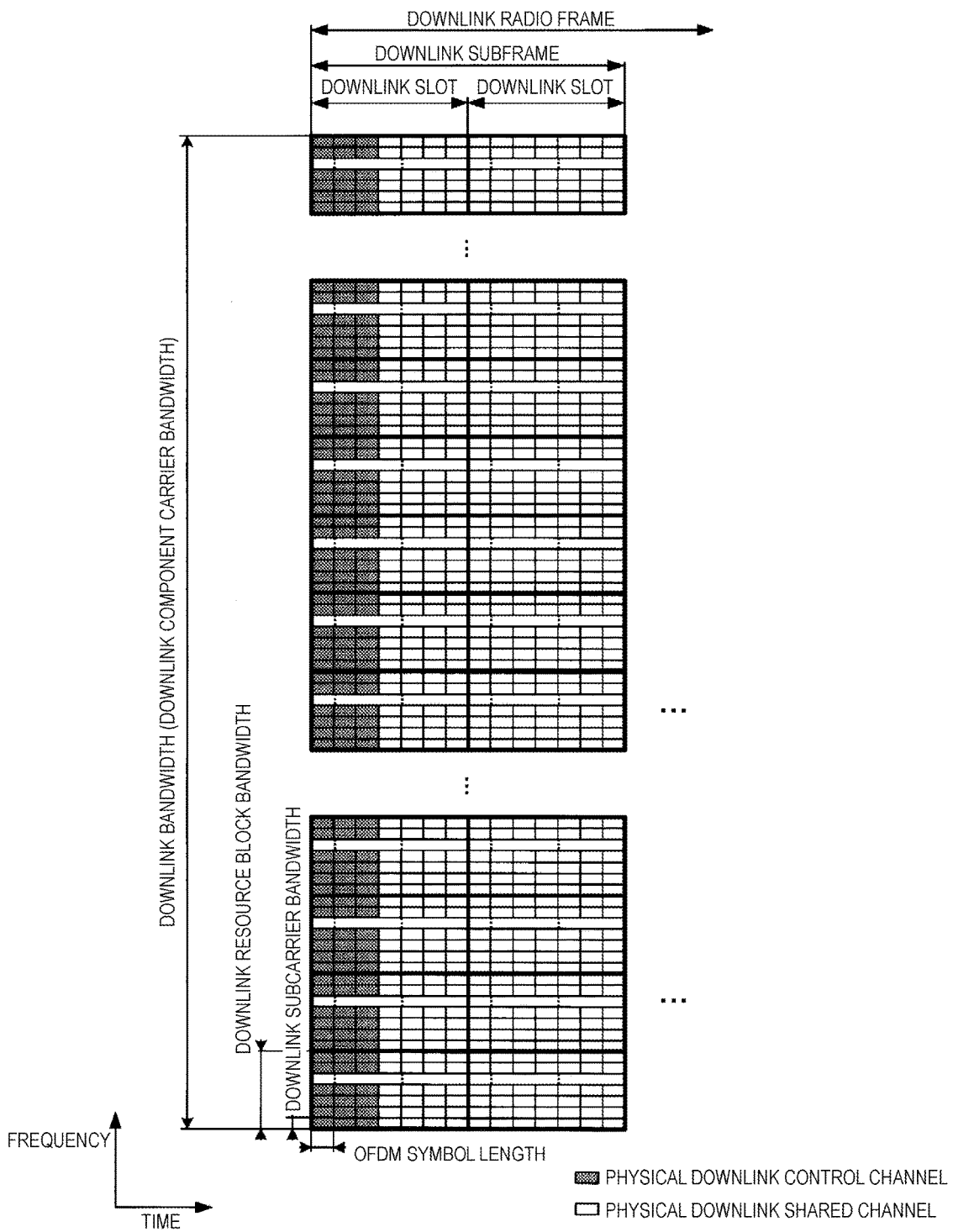
FIG. 1 is a diagram illustrating an example of a downlink radio frame configuration according to a first embodiment.

A first embodiment of the present invention will be described below. Description will be given by using a communication system in which a base station device (base station, NodeB, or EUTRAN NodeB (eNB)) and a terminal device (terminal, mobile station, user device, or User equipment (UE)) communicate in a cell.

Main physical channels and physical signals used in the EUTRA and the A-EUTRA will be described. The "channel" refers to a medium used to transmit a signal, and the "physical channel" refers to a physical medium used to transmit a signal. In the present embodiment, the "physical channel" may be used as a synonym of "signal". In the future EUTRA and A-EUTRA, another physical channel may be added, the constitution or format of the existing physical channel may be changed, or another constitution or format may be added; however, the description of each embodiment of the present invention will not be affected even in a case that such addition or change is performed.

In the EUTRA and the A-EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a certain frequency domain constituted of a set of multiple subcarriers (e.g., 12 subcarriers) on a frequency axis and a domain constituted of a certain transmission time slot (one slot). One subframe may be referred to as "one resource block pair".

HD-FDD has two types: for type A HD-FDD operation, a guard period is created by a terminal device by not receiving the last part (last symbol) of a downlink subframe immediately preceding an uplink subframe from the same terminal device; and for type B HD-FDD operation, guard periods, each referred to as an HD guard subframe, are created by a terminal device by not receiving a downlink subframe immediately preceding an uplink subframe from the same terminal device, and by not receiving a downlink subframe immediately following an uplink subframe from the same terminal device. That is, in the HD-FDD operation, a guard period is created by the terminal device controlling a reception process of the downlink subframe. The symbol may include one of an OFDM symbol and an SC-FDMA symbol.

Frame structure type 2 is applicable to TDD. Each radio frame is constituted of two half-frames. Each half-frame is constituted of five subframes. A UL-DL configuration in a certain cell may vary among radio frames, and the control of the subframe in uplink or downlink transmission may occur in the latest radio frame. The UL-DL configuration in the latest radio frame is acquirable via a PDCCH or higher layer signalling. Note that the UL-DL configuration indicates a constitution of uplink subframes, downlink subframes, and special subframe(s) in TDD. The special subframe is constituted of a DwPTS capable of downlink transmission, a guard period (GP), and a UpPTS capable of uplink transmission. The constitution of a DwPTS and a UpPTS in the special subframe are managed in a table, and the terminal device can acquire the constitution via higher layer signalling. Note that the special subframe serves as a switch point from downlink to uplink.

A terminal device used for LAA communications according to the embodiments of the present invention may be referred to as "LAA terminal" in order to be differentiated from a terminal device such as a cellular phone. Note that according to the embodiments of the present invention, the terminal device includes the LAA terminal. The LAA terminal is an LTE terminal specialized/limited to a specific function. Here, the LTE terminal in the related art, i.e., the LTE terminal for which functions relating to the LAA are not supported is simply referred to as "LTE terminal". Similarly, for base station devices, the base station device for which the LAA functions are supported may be referred to as "LAA base station", and the base station device for which the LAA functions are not supported may be referred to as "LTE base station".

The terminal device and the base station device for LAA communications may communicate with each other in an unlicensed frequency band.

The frequencies at which LAA communications are allowed may be configured as an operating band. For example, for the operating band, a range of frequency (uplink frequency and/or downlink frequency) (that is, a frequency band) corresponding to an index is associated with a duplex mode. That is, these parameters may be managed using a table. The operating band may further be associated with an offset value that determines a central frequency (carrier frequency). The terminal device can determine a frequency and an index of band to which the frequency belongs, based on the offset value. For example, for index 33, the corresponding range of frequency is from 1900 MHz to 1920 MHz and the corresponding duplex mode is TDD. The central frequency may be set in steps of 0.1 MHz based on the offset value.

The operating bands corresponding to the LAA may be managed together with a table for the EUTRA operating bands. For example, indices 1 to 44 may be used to manage the EUTRA operating bands, and indices 252 to 255 may be used to manage the operating bands corresponding to the LAA (or the frequencies for the LAA). For example, for indices 252 to 255, only downlink frequency bands may be defined. Moreover, for some indices, uplink frequency bands may be reserved or pre-provided for future definition. Moreover, the corresponding duplex mode may be different from FDD or TDD or may be FDD or TDD. The frequencies at which LAA communications are allowed are preferably equal to or higher than 5 GHz but may be equal to or lower than 5 GHz. That is, LAA communications are performed at the associated frequencies as the operating bands corresponding to the LAA.

The operating bands corresponding to the LAA may be managed using a table different from the table for the EUTRA operating bands. The corresponding range of frequency (uplink frequency and/or downlink frequencies) (that is, frequency band) may be associated with the duplex mode separately from the indices of the EUTRA operating bands. In addition, the offset values used to determine the central frequencies may be configured separately from the offset values corresponding to the EUTRA operating bands.

In order to realize LAA communications, the number or functions of processing units (transmission unit, reception unit, control unit, and the like) included in a communication device (terminal device and/or base station device, device, or module) may be extended compared to the number or functions of LTE terminals in the related art. For example, a Radio Frequency (RF) unit, an Intermediate Frequency (IF) unit, and a baseband unit used for the transmission unit and the reception unit may be extended to enable simultaneous transmission and/or reception in multiple bands. A bandwidth (the number of resource blocks and the number of subcarriers (resource elements)) supported by a filter unit, a Single Carrier-Frequency Division Multiple Access (SC-FDMA) signal transmission unit/reception unit, an OFDM signal transmission unit/reception unit, an uplink subframe generation unit, a downlink subframe generation unit, and the like used for the transmission unit and the reception unit may be extended.

The LAA terminal may include a transmission unit (transmission circuit) and a reception unit (reception circuit) having complicated configurations compared to the LTE terminal. For example, the LAA terminal may have more RF units (RF circuits) and transmit antenna/receive antenna (antenna ports) compared to the LTE terminal. Moreover, the LAA terminal may have a supported function that is extended compared to the LTE terminal. Moreover, the LAA terminal may have a supported bandwidth (transmission and/or reception bandwidth, measurement bandwidth, and channel bandwidth) configured to be wider compared to the LTE terminal. For example, the LAA terminal may have an extended function relating to filtering.

The base station device may determine that the terminal device is an LAA device based on a Logical Channel ID (LCID) for a Common Control Channel (CCCH) and capability information (performance information) on the terminal device.

The S1 signalling has been extended to include terminal radio capability information for paging. In a case that this paging-specific capability information is provided by the base station device to a Mobility Management Entity (MME), the MME may use this information to indicate to the base station device that a paging request from the MME relates to the LAA terminal. Each identifier may be referred to as "ID" (Identity, Identifier).

The capability information on the terminal device (UE radio access capability, UE EUTRA capability) initiates a procedure for the terminal device in a connected mode, in a case that the base station device (EUTRAN) requires the capability information on the terminal device. The base station device inquires for the capability information on the terminal device, and transmits, in response to the inquiry, the capability information on the terminal device. The base station device determines in a case that the capability information is supported. In a case that the capability information is supported, the base station device transmits configuration information corresponding to the capability information via, e.g., higher layer signalling to the terminal device. In a case that the configuration information corresponding to the capability information is configured, the terminal device determines that transmission and/or reception based on the capabilities thereof can be performed.

FIG. 1 is a diagram illustrating an example of a downlink radio frame configuration according to the present embodiment. The downlink uses an OFDM access scheme. In the downlink, a Physical Downlink Control Channel (PDCCH), an Enhanced PDCCH (EPDCCH), a Physical Downlink Shared Channel (PDSCH), and the like are allocated. A downlink radio frame is constituted of downlink resource block (RB) pairs. Each of the downlink RB pairs is a unit for allocation of downlink radio resources and the like and is constituted of a frequency band of a predefined width (RB bandwidth) and a time duration (two slots equal to one subframe). Each of the downlink RB pairs is constituted of two downlink RB s (RB bandwidth×slot) that are contiguous in the time domain. Each of the downlink RBs is constituted of 12 subcarriers in the frequency domain. In the time domain, the downlink RB is constituted of seven OFDM symbols in a case that a normal cyclic prefix (Normal CP: NCP) is added, while the downlink RB is constituted of six OFDM symbols in a case that a cyclic prefix that is longer than the normal cyclic prefix (Extended CP: ECP) is added. A region defined by a single subcarrier in the frequency domain and a single OFDM symbol in the time domain is referred to as "resource element (RE)". The PDCCH/EPDCCH is a physical channel on which downlink control information (DCI) such as a terminal device identifier, PDSCH scheduling information, Physical Uplink Shared Channel (PUSCH) scheduling information, a modulation scheme, a coding rate, and a retransmission parameter is transmitted. Note that although a downlink subframe in a single component carrier (CC) is described here, a downlink subframe is defined for each CC and downlink subframes are substantially synchronized between the CCs.

Note that although not illustrated here, Synchronization Signals (SSs) may be assigned, a Physical Broadcast Channel (PBCH) may be allocated, and a Downlink Reference Signal (DLRS) may be assigned, to a downlink subframe. Examples of the DLRS are a Cell-specific Reference Signal (CRS), which is transmitted through the same antenna port (transmit port) as that for a PDCCH, a Channel State Information Reference Signal (CSI-RS), which is used to measure Channel State Information (CSI), a UE-specific Reference Signal (UERS)), which is transmitted through the same antenna port as that for one or some PDSCHs, and a Demodulation Reference Signal (DMRS), which is transmitted through the same transmit port as that for an EPDCCH. Moreover, carriers on which no CRS is mapped may be used. In this case, a similar signal (referred to as "enhanced synchronization signal") to a signal corresponding to some antenna ports (e.g., only antenna port 0) or all the antenna ports for the CRS can be inserted into some subframes (e.g., the first and sixth subframes in the radio frame) as time and/or frequency tracking signals. Here, an antenna port may be referred to as "transmit port". Here, the term "physical channel/physical signal is transmitted through an antenna port" includes a meaning that a physical channel/physical signal is transmitted via a radio resource or layer corresponding to the antenna port. For example, the reception unit is intended to receive a physical channel or physical signal via a radio resource or layer corresponding to the antenna port.

Figure 2:
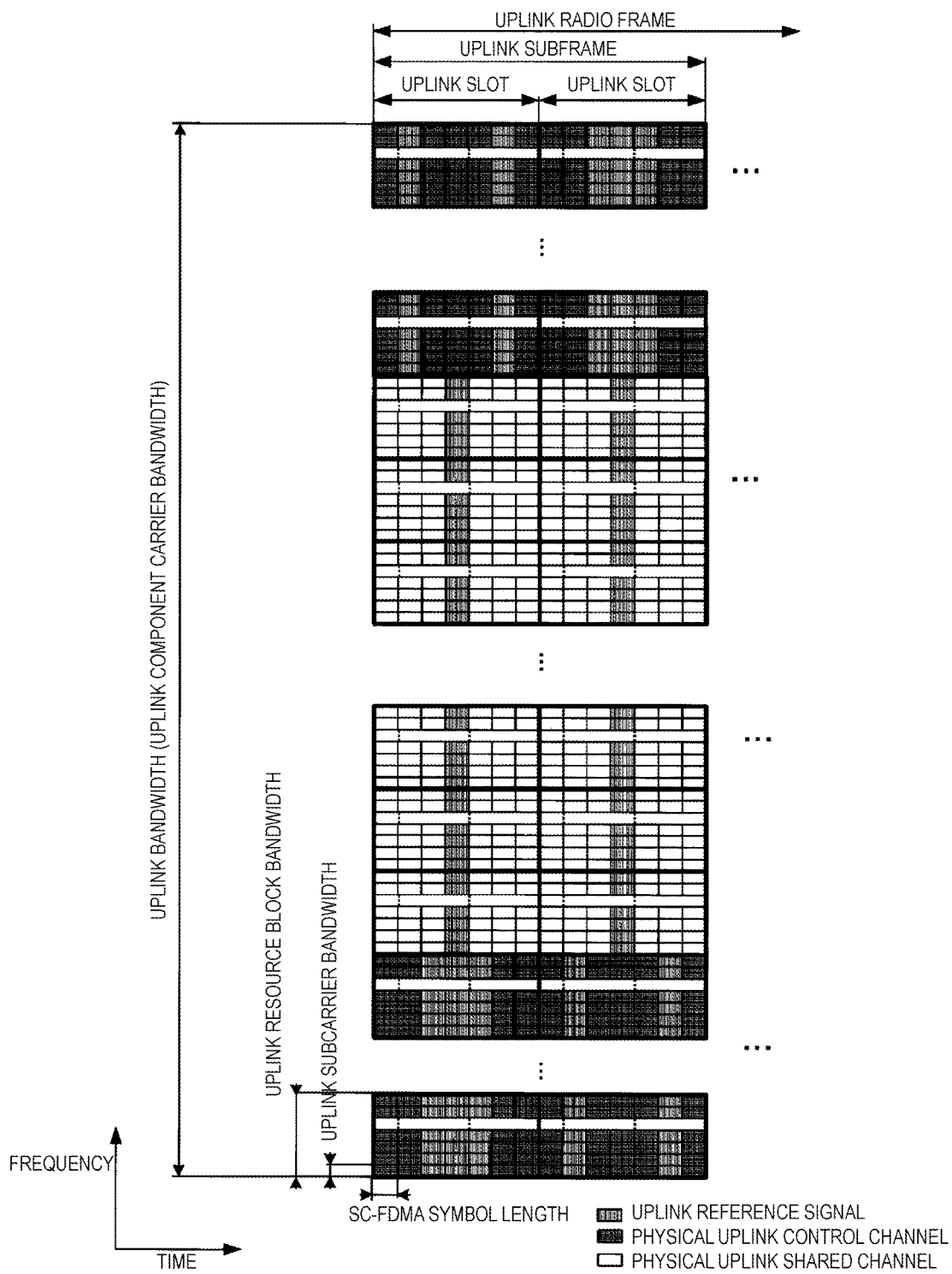
FIG. 2 is a diagram illustrating an example of an uplink radio frame configuration according to the first embodiment.

FIG. 2 is a diagram illustrating an example of an uplink radio frame configuration according to the present embodiment. The uplink uses an SC-FDMA scheme. In the uplink, a Physical Uplink Shared Channel (PUSCH), a Physical Uplink Control Channel (PUCCH), and the like are assigned. Moreover, an Uplink Reference Signal (ULRS) is assigned together with the PUSCH and the PUCCH. An uplink radio frame is constituted of uplink RB pairs. Each of the uplink RB pairs is a unit for allocation of uplink radio resource and the like and is constituted of a frequency domain of a predefined width (RB bandwidth) and a time domain (two slots equal to one subframe). Each of the uplink RB pairs is constituted of two uplink RBs (RB bandwidth× slot) that are contiguous in the time domain. Each of the uplink RB is constituted of 12 subcarriers in the frequency domain. In the time domain, the uplink RB is constituted of seven SC-FDMA symbols in a case that a normal cyclic prefix (Normal CP) is added, while the uplink RB is constituted of six SC-FDMA symbols in a case that a cyclic prefix that is longer than the normal cyclic prefix (Extended CP) is added. Note that although an uplink subframe in a single CC is described here, an uplink subframe is defined for each CC.

Now, physical channels and physical signals according to the present embodiment will be described. Basically, parameters for configuration for the physical channels and/or physical signals may be configured in the terminal device via the higher layer signalling as higher layer parameters. Parameters for configuration for some of the physical channels and/or physical signals may be configured in the terminal device via L1 signalling (physical layer signalling, e.g., the PDCCH), such as DCI format and grant. For the higher layer signalling, the type of signalling/messages used to notify corresponding configurations such as an RRC message, broadcast information, and system information may vary according to the configurations.

A synchronization signal is constituted of one of three types of Primary Synchronization Signals (PSSs) and a Secondary Synchronization Signal (SSS) constituted of 31 types of codes that are interleaved in the frequency domain. 504 patterns of cell identities (Physical Cell IDs (PCIs)) for identifying base station devices, and frame timing for radio synchronization are indicated by the combinations of the PSS and the SSS. The terminal device identifies the physical cell ID in a synchronization signal received by cell search. The PSS/SSS is allocated with six RBs (i.e., 72 REs, 72 subcarriers) at the center of transmission bandwidth (or the system bandwidth). However, the PSS/SSS need not be mapped to several subcarriers at each of both ends of the six RBs to which no sequence of the PSS/SSS is allocated. That is, the terminal device processes even resources to which no sequence of the PSS/SSS is allocated by determining the resources to be those for the PSS/SSS. In other words, resources to which no PSS/SSS is transmitted may be present in the six RBs at the center.

The Physical Broadcast Channel (PBCH) is used to notify (configure) control parameters (broadcast information, system information (SI)) that are commonly used among terminal devices in a cell. The terminal devices in the cell are notified, on the PDCCH, of the radio resource in which broadcast information is transmitted. Broadcast information not notified on the PBCH is transmitted, as a layer-3 message (system information) for making notification of the broadcast information on the PDSCH, in the notified radio resource. The TTI (repetition rate) of PBCH to which a Broadcast Channel (BCH) is mapped is 40 ms.

The PBCH is allocated with six RBs (i.e., 72 REs, 72 subcarriers) at the center of the transmission bandwidth (or the system bandwidth). Furthermore, the PBCH is transmitted in four contiguous radio frames that start with a radio frame satisfying system frame number (SFN, radio frame number) mod 4=0. A scramble sequence of PBCH is initialized with the PCI in each radio frame satisfying radio frame number (SFN) mod 4=0. The number of antenna ports for PBCH is the same as the number of antenna ports for CRS. The PDSCH is not transmitted in resources which overlap with the PBCH or CRS. That is, the terminal device does not expect that the PDSCH is mapped to the same resource as that for the PBCH or CRS. In addition, the base station device does not map the PDSCH to the same resource as that for the PBCH or CRS for transmission.

The PBCH is used to broadcast system control information (master information block (MIB)).

The MIB includes system information transmitted on a BCH. For example, the system information included in the MIB includes downlink transmission bandwidth, PHICH configuration, and a system frame number. The MIB also includes spare bits (bit sequence) of 10-bit length. Note that the downlink transmission bandwidth may be included in mobility control information. The mobility control information may be included in information on RRC connection reconfiguration. That is, the downlink transmission bandwidth may be configured via an RRC message/higher layer signalling.

Note that according to the embodiments of the present invention, a bit sequence may be referred to as a "bit map". The bit sequence may be constituted of one or more bits.

System information to be transmitted in a form other than the MIB is transmitted in a System Information Block (SIB). A System Information message (SI message) is used to transmit one or more SIBs. All the SIBs included in the SI message are transmitted at the same periodicity. Furthermore, all the SIBs are transmitted on a DownLink Shared Channel (DL-SCH). Note that the DL-SCH may be referred to as "DL-SCH data" or "DL-SCH transport block". Note that according to the embodiments of the present invention, the transport block is a synonym of a transport channel.

The resource allocation for a PDSCH, on which the DL-SCH having an SI message mapped thereto is transmitted, is indicated by a PDCCH involving CRC scrambled with an SI-RNTI. A search space for the PDCCH involving the CRC scrambled with the SI-RNTI is a CSS.

The resource allocation for a PDSCH, on which the DL-SCH having information on a random access response mapped thereto is transmitted, is indicated by a PDCCH involving CRC scrambled with an RA-RNTI. A search space for the PDCCH involving the CRC scrambled with the RA-RNTI is a CSS.

The resource allocation for a PDSCH, on which a PCH having a paging message mapped thereon is transmitted, is indicated by a PDCCH involving CRC scrambled with a P-RNTI. A search space for the PDCCH involving the CRC scrambled with the P-RNTI is a CSS. Note that the PCH may be referred to as "PCH data" or "PCH transport block". In the embodiments of the present invention, the paging message may be a synonym of a PCH.

The SIB has, for each type, different system information that is transmittable. That is, different information is indicated for each type.

For example, system information block type 1 (SIB 1) includes information associated with estimation (evaluation, measurement) in a case that the terminal device attempts to access a certain cell, and defines scheduling for other system information. For example, SIB 1 includes: information associated with cell access such as a PLMN identity list, a cell identity, and a CSG identity; cell selection information; a maximum power value (P-Max); a frequency band indicator; an SI-window length; transmission periodicity of an SI message; a TDD configuration, and the like.

In a case of receiving SIB 1 through broadcast or dedicated signalling, the terminal device determines that access to a cell is prohibited in a case that the terminal device is in an idle mode or connected mode while T311 is in operation and that the terminal device is a category 0 terminal and that information, indicating that the category 0 terminal is allowed to access a cell (category0Allowed), is not included in SIB 1. That is, in a case that SIB 1 indicates that the category 0 terminal is not allowed to access a cell, the category 0 terminal fails to access the cell.

For example, system information block type 2 (SIB 2) includes radio resource configuration information that is common for all the terminal devices. For example, SIB 2 includes frequency information such as an uplink carrier frequency and uplink bandwidth, information on a time adjusting timer, and the like. SIB 2 further includes information on configuration for a physical channel/physical signal, such as a PDSCH and a PRACH, an SRS, an uplink CP length, and the like. SIB 2 further includes information on configuration for signalling of higher layers such as RACH and BCCH.

For example, system information block type 3 (SIB 3) includes information (parameters, parameter values) common for intra-frequency cell re-selection, inter-frequency cell re-selection, and inter-radio access technology (RAT) cell re-selection.

Although 17 types of SIBs have been provided, a new one may be added/defined according to use thereof.

The SI message includes an SIB other than SIB 1.

On the PBCH, a coded BCH transport block is mapped to four subframes within a 40 ms interval. A 40-ms timing for the PBCH is blindly detected. That is, there is no explicit signalling indicating the 40-ms timing. Each subframe is assumed to be self-decodable. That is, the BCH can be decoded from a single reception, assuming sufficiently good channel conditions.

The MIB (or PBCH) uses a fixed schedule with a periodicity of 40 ms and repetitions made within 40 ms. The first transmission of the MIB is scheduled in subframe #0 of radio frames that satisfy SFN mod 4=0, and the repetitions are scheduled in subframe #0 of all other radio frames. That is, the information included in the MIB may be updated with a periodicity of 40 ms. Note that the SFN denotes a radio frame number.

SIB 1 uses a fixed schedule with a periodicity of 80 ms and repetitions made within 80 ms. The first transmission of SIB 1 is scheduled in subframe #5 of radio frames that satisfy SFN mod 8=0, and the repetitions are scheduled in subframe #5 of all other radio frames that satisfy SFN mod 2=0.

The SI message is transmitted within periodically occurring time domain windows (SI-windows) using dynamic scheduling (PDCCH scheduling, a PDCCH involving CRC scrambled with a System Information Radio Network Temporary Identifier (SI-RNTI)). Each SI message is associated with an SI-window, and the SI-windows of different SI messages do not overlap. Within one SI-window, only the corresponding SI is transmitted. The length of the SI-window is common for all SI-messages and is configurable. Within the SI-window, the corresponding SI message can be transmitted a number of times in any subframe other than Multimedia Broadcast multicast service Single Frequency Network (MBSFN) subframes, uplink subframes in TDD, and subframe #5 of radio frames that satisfy SFN mod 2=0. The terminal device acquires the detailed time-domain scheduling (and other information, e.g., frequency-domain scheduling, used transport format) from decoding SI-RNTI on PDCCH. Note that the SI message includes a SIB other than SIB 1.

The terminal device applies a system information acquisition procedure to acquire the AS- and NAS-system information that is broadcasted by the EUTRAN. This procedure applies to a terminal device in the idle mode (idle state, RRC_IDLE) and the connected mode (connected state, RRC_CONNECTED).

The terminal device needs to hold a valid version of required system information.

In the idle mode, via system information block type 8 (SIB 8) relying on the support of the associated RAT and system information block type 17 relying on the support of Wireless Local Area Network (WLAN) interworking assisted by a Radio Access Network (RAN), not only SIB 2 but also the MIB and SIB 1 are required. That is, the required SIB may vary according to the functions supported by the terminal device.

In the connected mode, the MIB, SIB 1, SIB 2, and SIB 17 are required.

The terminal device deletes the system information three hours after the terminal device confirms that the stored system information is valid. That is, the terminal device does not permanently continue to store the temporarily stored information. The terminal device deletes the stored system information once a prescribed time has elapsed.

In a case that a system information value tag included in SIB 1 is different from the one of the stored system information, the terminal device considers any stored system information except system information block type 10 (SIB 10), system information block type 11 (SIB 11), system information block type 12 (SIB 12), and system information block type 14 (SIB 14) to be invalid.

The PBCH is allocated to six RBs at the center of downlink bandwidth configuration (72 REs) in the frequency domain, and is allocated to indices (OFDM symbol indices) 0 to 3 in slot 1 (the second slot of the subframe, slot index 1) of subframe 0 (the first subframe of the radio frame, subframe index 0) in the time domain. Note that the downlink bandwidth configuration is represented by a multiple of the resource block size in the frequency domain, expressed as the number of subcarriers. Furthermore, the downlink bandwidth configuration is a downlink transmission bandwidth configured in a certain cell. That is, the PBCH is transmitted with six RBs at the center of the downlink transmission bandwidth.

The PBCH is not transmitted with resources reserved for the DLRS. That is, the PBCH is mapped to resources other than the DLRS resources. Regardless of the actual configuration, the PBCH mapping is performed by assuming CRSs for existing antenna ports 0 to 3. Furthermore, resource elements for the CRSs for antenna ports 0 to 3 are not utilized for PDSCH transmission.

As broadcast information, a cell global identifier (CGI) indicating a cell-specific identifier, a tracking area identifier (TAI) for managing a standby area by paging, random access configuration information (such as a transmission timing timer), shared radio resource configuration information, neighboring cell information, and uplink access restriction information on the cell, and the like are notified.

The DLRS is classified into multiple types according to use thereof. For example, the CRS is a pilot signal transmitted with prescribed power in each cell and is a DLRS periodically repeated in the frequency domain and the time domain under a prescribed rule. The terminal device receives the CRS to measure reception quality (Reference Signal Received Power (RSRP), Reference Signal Received Quality (RSRQ)) for each cell. The terminal device also uses the CRS as a reference signal for demodulation of a PDCCH or a PDSCH transmitted at the same time as the CRS. The sequence used for the CRS is distinguishable among the cells. That is, the sequence used for the CRS may be set based on the cell ID.

The DLRS is also used for estimation (channel estimation) of downlink channel variation. A DLRS used for estimation of channel variation (channel state) is referred to as "CSI-RS". Furthermore, a DLRS individually configured for each terminal device is referred to as "UERS", "DMRS", or "Dedicated RS", and is referenced for a channel compensation process on a channel for demodulating an EPDCCH or a PDSCH. The DMRS is provided for each of the downlink and the uplink. To facilitate identification, in the embodiments of the present invention, the DMRS for the downlink is referred to as "UERS" or "DL DMRS", and the DMRS for the uplink is simply referred to as "DMRS" or "UL DMRS".

CSI includes a Channel Quality Indicator (CQI), a Precoding Matrix Indicator (PMI), a Precoding Type Indicator (PTI), and a Rank Indicator (RI), which can be used respectively for specifying (representing) a preferable modulation scheme and coding rate, a preferable precoding matrix, a preferable PMI type, and a preferable rank. Note that each "indicator" may be denoted as "indication". Moreover, the CQI and the PMI are classified into a wideband CQI and PMI assuming transmission using all the resource blocks in a single cell and a subband CQI and PMI assuming transmission using some contiguous resource blocks (subbands) in a single cell. Moreover, the PMI includes a normal type of PMI indicating a single preferable precoding matrix with a single PMI, and another type of PMI indicating a single preferable precoding matrix with two kinds of PMIs, a first PMI and a second PMI. Note that the CSI is reported on a PUCCH and a PUSCH. The terminal device may measure the CSI based on the CRS in a case that the terminal device has no parameters for the CSI-RS set in the terminal device itself or has no function to receive/measure the CRI-RS.

Channel State Information-Interference Measurement (CSI-IM) is performed based on CSI-RS resources with zero power. As for the CSI-RS with zero power used for the CSI-IM, unlike in a case that the CSI is measured, the CSI-RS is not transmitted from the connected base station device (cell). That is, the terminal device uses resources with no CSI-RS mapped to the resources to measure interference power and noise power from neighbor cells (that is, the power of signals transmitted from the base station devices and/or terminal devices belonging to the neighbor cells (non-serving cells) and noise power). In a case of measurement of the CSI, CSI-RS resources with non-zero power are used. The CSI-RS resources with zero power and the CSI-RS resources with non-zero power are individually configured using the higher layer parameters. The resources are configured based on an index indicating which of the resource elements in one resource block is used, and transmission subframes and a transmission periodicity (measured subframes and measurement periodicity) or a subframe pattern. For the subframe pattern, a 16-bit bit sequence is used to indicate the subframes to which the CSI-RS resources with zero power are allocated. "1" is set for the subframes to which the CSI-RS resources with zero power are allocated. The terminal device does not expect that the CSI-RS resources with zero power and non-zero power are configured using a Physical Multicast Channel (PMCH) and the same subframe of a certain serving cell. The configuration relating to the CSI-RS resources with zero power may be configured for use for applications other than the CSI-IM.

Moreover, the terminal device does not expect that in the subframe pattern, for a serving cell with frame structure Type 1, any one of lower 6 bits of the 16 bits is set to "1" for the NCP and any one of the lower 8 bits of the 16 bits is set to "1" for the ECP. Moreover, the terminal device does not expect that for a 4CRS port in a serving cell with frame structure Type 2, any one of lower 6 bits of the 16 bits is set to "1" for the NCP and any one of the lower 8 bits of the 16 bits is set to "1" for the ECP.

A Discovery Signal(s) (DS) is used for time-frequency synchronization, cell identification, and Radio Resource Management (RRM) measurement (intra- and/or inter-frequency measurement) at frequencies for which parameters for the DS are configured. Moreover, the DS is constituted of multiple signals, which are transmitted with the same periodicity. The DS may be constituted using resources for the PSS/SSS/CRS and further constituted using resources for the CSI-RS. For the DS, the RSRP or the RSRQ may be measured using resources with the CRS or the CSI-RS mapped to the resources. A timing for measuring the DS (measured subframes and measurement periodicity) is determined based on parameters included in a DS Measurement Timing Configuration (DMTC). The measurement periodicity of the DS is configured as multiples of 40 ms, i.e., 40 ms, 80 ms, and 120 ms. Moreover, the measured subframes for the DS may be associated with the measurement periodicity (transmission periodicity) and configured as a parameter separate from the periodicity. Moreover, the measured subframes may be an offset of subframes with respect to subframe 0 with system frame number 0. Moreover, the measured subframes may be configured based on a subframe offset from the subframe corresponding to subframe 0 in the measurement periodicity. The RRM measurement includes at least one of the RSRP, the RSRQ, and the RSS measurements. The DS may be referred to as "Discovery Reference Signal(s) (DRS)". Parameters for the DMTC (configuration for the subframe offset and the periodicity) are included in the measurement DS configuration.

The terminal device determines a start position of a DS occasion in which the DS may be transmitted (the start position of the subframes) based on the DMTC configuration. The length of the DS occasion is fixed (e.g., 6 subframes). In the subframes in the DC occasion, the period of subframes in which the DS is actually transmitted is configured in the measurement DS configuration as a DS duration (DS occasion duration). The CRS included in the DS may be transmitted in all the subframes in the DS duration. In addition, in a case that the measurement DS configuration includes parameters for the CSI-RS, the terminal device can measure the CSI-RSPP. The measurement DS configuration may be included in a measurement object configuration. That is, in a case that the measurement object configuration includes the measurement DS configuration, the terminal device can measure the DS based on the DMTC. On the basis of the DS duration, the terminal device monitors the DS starting with the leading subframe in the DS occasion. On the basis of the duration from the subframe for which the PSS/SSS included in the DS has been detected, the terminal device monitors the corresponding DS (CRS and CSI-RS).

The CRS included in the DS may be mapped to all the subframes in the duration.

For the CSI-RS included in the DS, 0 or more resources may be configured. The CSI-RS included in the DS may be listed for management. The configurations of the resources for the ID and the CSI-RS included in the list may be associated with each other. That is, multiple CSI-RSs may be included in one DS (one duration).

The DS may be transmitted from a base station device constituting a cell that can be activated/deactivated (turned on/off) (that is, using a frequency of the cell that can be activated/deactivated).

In the embodiments of the present invention, the duration is a synonym of one or more contiguous subframes or symbols. Moreover, the duration may be referred to as "burst". That is, the burst is also a synonym of one or more contiguous subframes or symbols. A unit (dimension) used for the duration may be determined based on the configured parameters.

The measurement periodicity and the measured subframes are parameters for measurement at the terminal device and also parameters for transmission at the base station device. Moreover, parameters for reception at the terminal device may also be parameters for the transmission at the base station device. That is, based on the parameters configured in the terminal device, the base station device may transmit a corresponding downlink signal. Moreover, the parameters for the transmission at the terminal device may also be parameters for the reception or measurement at the base station device. That is, based on the parameters configured in the terminal device, the base station device may receive a corresponding uplink signal.

The configuration for the CSI-RS included in the measurement DS configuration includes an ID associated with the CSI-RS to be measured (the ID of the measured CSI-RS), a physical layer cell ID and a scrambling ID used to generate a sequence, a resource configuration that determines a time-frequency resource for the CSI-RS (a pair of resource elements), a subframe offset indicative of a subframe offset from the SSS, and power offsets individually configured in the CSI-RS.

The measurement DS configuration includes an ID addition/change list and an ID deletion list corresponding to the configuration for the CSI-RS. The terminal device measures the resources for the CSI-RS associated with the ID of the measured CIS-RS set in the addition/change list. Moreover, the terminal device stops measurement of the resources for the CSI-RS associated with the ID of the measured CIS-RS set in the deletion list.

A DS occasion for a certain cell (frequency) is, for frame structure Type 1, constituted of a periodicity involving a duration of one to five contiguous subframes, and for frame structure Type 2, constituted of a periodicity involving a duration of two to five contiguous subframes. In the periodicity and for the duration, the terminal device assumes the presence of the DS to perform measurement.

The CRS constituting the DS (or included in the subframes in the DS occasion) is mapped to resources for antenna port 0 in the DwPTSs of all the downlink subframes and special subframe during the period. "Constituting the DS" may be a synonym of "included in the subframes of the DS occasion".

The PSS included in the DS is, for frame structure Type 1, mapped to a first subframe during the period, and for frame structure Type 2, mapped to a second subframe during the period.

The SSS included in the DS is mapped to the first subframe during the period.

In a case that the DS is included in the measurement object for the LAA frequencies, the resources for the PSS/SSS in the corresponding DS may be shifted in a frequency direction for mapping. The amount of shift may be determined based on a prescribed ID such as the cell ID or a value configured by a higher layer. Moreover, in the case that the DS is included in the measurement object for the LAA frequencies, the resources and the sequence for the PSS/SSS in the corresponding DS may be extended based on the measurement bandwidth.

For the CSI-RS included in the DS, resources with non-zero power are mapped to the 0 or more subframes during the period.

The terminal device may perform measurement on the assumption that one DS occasion is provided for each periodicity of the DMTC.

At the LAA frequencies, the base station device and/or the terminal device may further transmit an initial signal and a reservation signal.

The initial signal is a signal used to indicate a transmission start position for data signals (PDSCH and PUSCH), control signals (PDCCH and PUCCH), and reference signals (DLRS and ULRS). The initial signal may be referred to as "preamble". That is, in a case of receiving the initialization signal, the terminal device or the base station device can receive the subsequent data signal or control signal.

For the reservation signal, in a case that LBT is performed to determine the channel to be clear, the signal is transmitted with energy equal to or higher than a threshold and indicating that the channel is occupied to inhibit another base station device or terminal device from interrupting the channel. No data needs to be mapped to the reservation signal itself.

The initial signal may serve as the reservation signal. Moreover, the control information may be mapped to the initialization signal. Moreover, the initial signal may be used for time-frequency synchronization and cell identification.

The initial signal and/or the reservation signal may be used to configure Auto Gain Control (AGC).

The terminal device may determine whether the DS and the PSS/SSS/CRS/CSI-RS (periodically transmitted signals other than the DS) are periodically transmitted based on whether LBT is performed at the base station device. In a case that LBT is performed at the base station device, the terminal device estimates that the DS is not periodically transmitted and measures the DS.

In a case of transmitting the DS at the LAA frequencies, the base station device may map the data information and/or the control information into the DS occasion. The data information and/or the control information may include information on an LAA cell. For example, the data information and/or the control information may include the frequency to which the LAA cell belongs, the cell ID, a load or congestion status, interference/transmit power, a channel occupancy time, and a buffer status relating to transmit data.

In a case that the DS is measured at the LAA frequencies, resources used for the signals included in the DS may be extended. For example, the resources corresponding not only to antenna port 0 but also to antenna ports 2, 3, and the like may be used for the CRS. Moreover, the resources corresponding not only to antenna port 15 but also to antenna ports 16, 17, and the like may be used for the CSI-RS.

The PDCCH is transmitted with some OFDM symbols (e.g., 1 to 4 OFDM symbols) from the beginning of each subframe. The EPDCCH is a PDCCH allocated in OFDM symbols in which a PDSCH is allocated. Parameters for the EPDCCH may be configured via an RRC message (higher layer signalling) as higher layer parameters. The PDCCH or EPDCCH is used to notify the terminal device of radio resource allocation information in accordance with scheduling determined by the base station device, information indicating an adjustment amount for an increase or decrease in transmit power, and other control information. That is, the PDCCH/EPDCCH is used to transmit DCI (or a DCI format including at least one piece of DCI). In each embodiment of the present invention, even in a case that the PDCCH alone is described, both physical channels, that is, the PDCCH and the EPDCCH, are included unless otherwise noted.

The PDCCH is used to notify the terminal device (UE) and a relay station device (RN) of resource allocation of a Paging Channel (PCH) and DL-SCH, and HARQ information on the DL-SCH (DL HARQ). The PDCCH is also used to transmit uplink scheduling grant and sidelink scheduling grant. That is, the PDCCH is used to transmit the DCI indicative of resource allocation for the PCH and/or the DL-SCH (resource allocation for the PDSCH) and the DCI indicative of HARQ-ACK for the PCH and/or the DL-SCH. The terminal device detects the PDSCH with the PCH or the DL-SCH mapped to the PDSCH based on the DCI.

The DCI indicative of the resource allocation for the PDH and/or the DL-SCH may include information on the resource allocation/information on virtual resource allocation for the PDSCH (information on resource block allocation), information on the number of antenna ports and layers for the UERS or the DMRS used to demodulate the PDSCH, and the like.

The DCI indicating the HARQ-ACK for the PCH and/or the DL-SCH may include information on a modulation and coding scheme, information indicating initial transmission or retransmission of the PCH or a DL-SCH transport block, information (Redundancy Version) indicating a start point in a circular buffer (the loading start position of stored data (HARQ soft buffer)), information on a Downlink Assignment Index (DAI) used for an HARQ-ACK procedure for the TDD taking into account possible HARQ protocol errors such as ACK erroneous transmission and PDCCH detection errors (information on subframes for the HARQ-ACK for PUSCH (UL-SCH), information on subframes for the HARQ-ACK for the PDSCH (PCH or DL-SCH)), and the like.

The EPDCCH is used to notify the terminal device (UE) of the DL-SCH resource allocation and HARQ information on the DL-SCH. The EPDCCH is also used to transmit the uplink scheduling grant and the sidelink scheduling grant.

The PDCCH is transmitted with an aggregation of one or several contiguous Control Channel Elements (CCEs). Note that a single CCE corresponds to nine resource element groups (REGs). The number of available CCEs in the system is determined with a Physical Control Format Indicator Channel (PCFICH) and a Physical HARQ Indicator Channel (PHICH) excluded. The PDCCH supports multiple formats (PDCCH formats). For each PDCCH format, the number of CCEs, the number of REGs, and the number of PDCCH bits are defined. A single REG is constituted of four REs. That is, one PRB may include up to three REGs. The PDCCH format is determined depending on the size of the DCI format, and the like.

Multiple PDCCHs are collectively processed by modulation and coding, and mapped to the whole downlink transmission bandwidth, and thus, the terminal device continues decoding PDCCHs until a PDCCH addressed to the terminal device itself is detected. That is, the terminal device fails to detect the PDCCH by receiving only a part of the frequency domain and demodulating and decoding the same. The terminal device fails to correctly detect the PDCCH addressed to the terminal device itself (PDCCH candidate) until the terminal device receives all the PDCCHs mapped to the whole downlink transmission bandwidth.

Multiple PDCCHs may be transmitted in a single subframe. Moreover, the PDCCH is transmitted through the same set of antenna ports as that for the PBCH. The EPDCCH is transmitted through an antenna port different from that for the PDCCH.

The terminal device needs to monitor the PDCCH addressed to the terminal device itself and receive the PDCCH addressed to the terminal device itself, before transmitting and/or receiving downlink data (DL-SCH) or a layer-2 message and layer-3 message which are higher-layer control information (such as a paging or handover command) to acquire, from the PDCCH, radio resource allocation information called uplink grant for transmission and downlink grant (downlink assignment) for reception. Note that the PDCCH can be configured so as to be transmitted in a resource block domain allocated individually to the terminal device by the base station device, in addition to being transmitted in the OFDM symbols described above.

The DCI is transmitted in a specific format. The uplink grant and downlink grant are transmitted in different formats. For example, the terminal device can acquire uplink grant from DCI format 0, and acquire downlink grant from DCI format 1A. In addition, other DCI formats are provided, including a DCI format containing only DCI indicating a transmit power control command for the PUSCH or PUCCH (DCI format 3/3A), a DCI format containing DCI indicating UL-DL configuration (DCI format 1C), and the like. For example, the radio resource allocation information for the PUSCH and the PDSCH is one type of DCI.

On the basis of the detected DCI (or a value set in a field of the detected DCI), the terminal device can configure various parameters of corresponding uplink signals and downlink signals, and perform transmission and/or reception. For example, in a case that DCI on PUSCH resource allocation is detected, the terminal device can allocate, based on the DCI, the PUSCH resource and transmit the PUSCH. In a case that a transmit power control command (TPC command) for the PUSCH is detected, the terminal device can adjust, based on the DCI, the transmit power of the PUSCH. In a case that DCI on PDSCH resource allocation is detected, the terminal device can receive the PDSCH from a resource indicated based on the DCI.

The terminal device can acquire (discriminate among) various pieces of DCI (DCI formats) by decoding a PDCCH involving Cyclic Redundancy Check (CRC) scrambled with a specific Radio Network Temporary Identifier (RNTI). The higher layer determines which PDCCH involving the CRC scrambled with the corresponding RNTI to decode.

Control information transmitted on a DL-SCH or a PCH corresponding to the PDCCH differs depending on with which RNTI the PDCCH is scrambled. For example, in a case that the PDCCH is scrambled with a Paging RNTI (P-RNTI), information on paging is transmitted on the PCH. In a case that the PDCCH is scrambled with a System Information RNTI (SI-RNTI), system information may be transmitted on the DL-SCH.

Moreover, the DCI format is mapped to a search space (Common Search Space (CSS), UE-specific SS (UESS)) given by a specific RNTI. Furthermore, the search space is defined as a set of PDCCH candidates to be monitored. That is, in each embodiment of the present invention, "monitoring a search space" is synonymous with "monitoring a PDCCH". Note that the CSS and the UESS in the PCell sometimes overlap. In the EPDCCH, only the UESS may be defined.

Examples of the RNTI used to scramble CRC include RA-RNTI, C-RNTI, SPS C-RNTI, temporary C-RNTI, eIMTA-RNTI, TPC-PUCCH-RNTI, TPC-PUSCH-RNTI, M-RNTI, P-RNTI, and SI-RNTI. The RA-RNTI, C-RNTI, SPS C-RNTI, eIMTA-RNTI, TPC-PUCCH-RNTI, and TPC-PUSCH-RNTI are configured in the terminal device by the base station device via higher layer signalling. The M-RNTI, P-RNTI, and SI-RNTI correspond to a single value. For example, the P-RNTI corresponds to a PCH and a PCCH, and is used to make notification of changes in paging and system information. The SI-RNTI corresponds to a DL-SCH and a BCCH, and is used to broadcast system information. The RA-RNTI corresponds to a DL-SCH, and is used for a random access response. The RA-RNTI, C-RNTI, SPS C-RNTI, temporary C-RNTI, eIMTA-RNTI, TPC-PUCCH-RNTI, and TPC-PUSCH-RNTI are configured with higher layer signalling. The M-RNTI, P-RNTI, and SI-RNTI are defined with prescribed values.

The PDCCH involving CRC scrambled with each RNTI may correspond to different transport channel and logical channel depending on an RNTI value. That is, different information may be indicated depending on the RNTI value.

A single SI-RNTI is used to address SIB 1 as well as all the SI messages.

The PHICH is used to transmit an HARQ-ACK/NACK (NAK) in response to uplink transmission.

The PCFICH is used to notify the terminal device and the relay station device of the number of OFDM symbols used for the PDCCH. Furthermore, the PCFICH is transmitted in each downlink subframe or each special subframe.

The PDSCH is used to notify the terminal device of broadcast information (system information) that is not notified on the PCH or the PBCH, as a layer-3 message, in addition to downlink data (DL-SCH data, a DL-SCH transport block). The radio resource allocation information on the PDSCH is indicated with the PDCCH. The PDSCH is allocated in an OFDM symbol other than an OFDM symbol in which the PDCCH is transmitted, to be transmitted. That is, the PDSCH and the PDCCH are subjected to time division multiplexing (TDM) within a single subframe. However, the PDSCH and the EPDCCH are frequency division multiplexing (FDM) within a single subframe.

The PDSCH may also be used to broadcast the system control information.

The PDSCH may also be used as paging in a case that the network does not know a cell in which the terminal device is located. That is, the PDSCH may be used to transmit paging information and modification notification of system information.

Moreover, the PDSCH may be used to transmit control information between a terminal device and the network, to the terminal device having no RRC connection with the network (the terminal device in the idle mode).

The PDSCH may also be used to transmit dedicated control information between a terminal device and the network, to the terminal device having an RRC connection (the terminal device in the connected mode).

The PDSCH is used to transmit a transport block corresponding to the RNTI added to the PDCCH. For example, the DL-SCH relating to a random access response is mapped to the PDSCH for which resource allocation is indicated by the PDCCH involving the CRC scrambled with the RA-RNTI. Moreover, the PCH relating to paging information is mapped to the PDSCH for which resource allocation is indicated by the PDCCH involving the CRC scrambled with the P-RNTI. Moreover, the DL-SCH associated with SIB is mapped to the PDSCH for which resource allocation is indicated by the PDCCH involving the CRC scrambled with the SI-RNTI. Moreover, the DL-SCH relating to an RRC message may be mapped to the PDSCH for which resource allocation is indicated by the PDCCH involving the CRC scrambled with the temporary-C-RNTI.

The PUCCH is used to perform reception confirmation reply (Hybrid Automatic Repeat reQuest-Acknowledgment (HARQ-ACK) or Acknowledgment/Negative Acknowledgment (ACK/NACK (or ACK/NAK)) for downlink data transmitted on the PDSCH, downlink channel CSI report, and uplink radio resource allocation request (radio resource request, scheduling request (SR)). That is, the PUCCH is used to transmit the HARQ-ACK/NACK, the SR, or the CSI report in response to downlink transmission. For the PUCCH, multiple formats are supported according to the type of uplink control information UCI such as the HARQ-ACK, the CSI, and the SR to be transmitted. For the PUCCH, a resource allocation method and a transmit power control method are defined for each format. The PUCCH uses one RB in each of two slots of one subframe. That is, the PUCCH is constituted of one RB, irrespective of the format. Furthermore, the PUCCH may not be transmitted in the UpPTS of the special subframe.

In a case that the PUCCH is transmitted in an SRS subframe, in a PUCCH format to which a shortened format is applied (e.g., formats 1, 1a, 1b, and 3), the last one symbol or two symbols to which an SRS may possibly be allocated (the last one symbol or two symbols of the second slot of the subframe) will be made empty.

One RB in each slot may support a combination of PUCCH formats 1/1a/1b and PUCCH formats 2/2a/2b. That is, the terminal device may transmit PUCCH formats 1/1a/1b and PUCCH formats 2/2a/2b in one RB.

The PUSCH mainly transmits uplink data (UL-SCH data, a UL-SCH transport block) and control data, and may include uplink control information (UCI) such as CSI, an ACK/NACK (HARQ-ACK), and an SR therein. Moreover, the PUSCH is also used by the terminal device to notify the base station device of a layer-2 message and layer-3 message, which are higher-layer control information, in addition to uplink data. In addition, as with downlink, the radio resource allocation information on the PUSCH is indicated with the PDCCH (PDCCH involving a DCI format). In a case that the PUSCH is transmitted in an SRS subframe and a PUSCH resource overlaps with an SRS bandwidth, then the last one symbol or two symbols to which the SRS may possibly be allocated (the last one symbol or two symbols of the second slot of the subframe) will be made empty.

An Uplink Reference Signal (ULRS) includes a Demodulation Reference Signal (DMRS) to be used by the base station device to demodulate the PUCCH and/or the PUSCH, and a Sounding Reference Signal (SRS) to be mainly used by the base station device to estimate/measure an uplink channel state or a transmission timing. Moreover, the SRS is categorized into a Periodic SRS (P-SRS), which is transmitted periodically, and an Aperiodic SRS (A-SRS), which is transmitted in a case that transmission is instructed by the base station device. Note that the P-SRS is referred to as "trigger type 0 SRS" and the A-SRS is referred to as "trigger type 1 SRS". The SRS is allocated to the last one symbol or two symbols in the subframe. The subframe in which the SRS is transmitted may be referred to as "SRS subframe". The SRS subframe is determined based on a cell-specific subframe configuration and a terminal device-specific subframe configuration. In a case that the PUSCH is transmitted in a subframe to which a cell-specific subframe configuration is set, none of the terminal devices in a cell allocate a PUSCH resource to the last symbol in the subframe. For the PUCCH, in a case that a shortened format is applied, in an SRS subframe that is set based on a cell-specific subframe configuration, none of the terminal devices a PUCCH resource to the last symbol in the subframe. However, the shortened format may not be applied depending on the PUCCH format. In such a case, the PUCCH may be transmitted in a normal format (i.e., transmitted with a PUCCH resource allocated to an SRS symbol). For the PRACH, the transmission thereof has a higher priority. In a case that an SRS symbol is arranged on a guard time of the PRACH, the SRS may be transmitted. Note that the ULRS may be referred to as an uplink pilot channel or pilot signal.

The P-SRS is transmitted in a case that higher layer parameters for the P-SRS are configured. In contrast, for the A-SRS, whether to transmit A-SRS is determined in the closest SRS subframe which is a prescribed number of subframes after the downlink subframe in which the SRS request has been received, based on a value to which higher layer parameters for the A-SRS are configured and which is set in an SRS request for requiring transmission of the SRS (A-SRS) included in the DCI format.

A Physical Random Access Channel (PRACH) is a channel used to notify (configure) a preamble sequence and includes guard time. The preamble sequence is constituted so that the base station device is notified of the information with multiple sequences. For example, in a case that 64 sequences are available, 6-bit information can be provided to the base station device. The PRACH is used by the terminal device to access the base station device (such as an initial access). The PRACH is used to transmit a random access preamble.

The terminal device uses the PRACH to request an uplink radio resource in a case that no PUCCH is configured for an SR or to request the base station device for transmission timing adjustment information (also referred to as "timing advance (TA) command") necessary for matching uplink transmission timing to a reception timing window of the base station device, for example. Moreover, the base station device can also request the terminal device to initiate a random access procedure with a PDCCH (referred to as "PDCCH order").

Now, a cell search according to the present embodiment will be described.

The cell search is a procedure by which the terminal device performs time-frequency synchronization with a certain cell and detects the cell ID of the cell. An EUTRA cell search supports the whole transmission bandwidth corresponding to 72 or more subcarriers and which can be enlarged and reduced. The EUTRA cell search is performed on the downlink based on the PSS and the SSS. The PSS and the SSS are transmitted using 72 subcarriers in the center of the bandwidth in the first subframe and the sixth subframe of each radio frame. Adjacent cell searches are performed as initial cell searches based on the same downlink signal.

Now, measurement of a physical layer according to the present embodiment will be described.

For example, the measurement of the physical layer includes intra- and inter-frequency measurement in an EUTRAN (RSRP/RSRQ), measurement of a time difference in reception and transmission of the terminal device and a time difference relating to a reference signal used to position the terminal device (RSTD), inter-RAT (EUTRAN-GERAN/UTRAN) measurement, and inter-system (EUTRAN-non-3GPP RAT) measurement. The measurement of the physical layer is performed to support mobility. Moreover, the EUTRAN measurement includes measurement performed by the terminal device in an idle mode and measurement performed by the terminal device in a connected mode. The terminal device performs the EUTRAN measurement in an appropriate measurement gap to synchronize with a cell having performed the EUTRAN measurement. These measurements may be referred to as measurements of the terminal device because the measurements are performed by the terminal device.

For the terminal device, at least two physical quantities (RSRP, RSRQ) may be supported for the measurement in the EUTRAN. In addition, for the terminal device, a physical quantity relating to the RSSI may be supported. On the basis of parameters relating to the physical quantities configured as higher layer parameters, the terminal device may perform the corresponding measurement.

The measurement of the physical layer is performed to support mobility. For example, the measurement of the physical layer includes the intra- and inter-frequency measurement in the EUTRAN (RSRP/RSRQ), the measurement of the time difference in reception and transmission of the terminal device and the time difference relating to the reference signal used to position the terminal device (RSTD), the inter-RAT (EUTRAN-GERAN/UTRAN) measurement, and the inter-system (EUTRAN-non-3GPP RAT) measurement. For example, the measurement of the physical layer includes measurement for intra- and inter-frequency handover, measurement for inter-RAT handover, timing measurement, measurement for the RRM, and measurement for positioning in a case that the positioning is supported. The measurement for inter-RAT handover is defined in conjunction with support of handover to GSM (registered trademark), UTRA FDD, UTRA TDD, CDMA2000, 1×RTT, CDMA2000 HRPD, and IEEE802.11. The EUTRAN measurement is used to support mobility. Moreover, the EUTRAN measurement includes measurement performed by the terminal device in an idle mode and measurement performed by the terminal device in a connected mode. For example, the RSRP and the RSRQ may be measured for each of the intra- and inter-frequencies by the terminal device in either of the modes. The terminal device performs the EUTRAN measurement in the appropriate measurement gap to synchronize with a cell having performed the EUTRAN measurement.

The measurement of the physical layer includes measuring radio performance by the terminal device and the base station device and reporting the radio performance to a higher layer in the network.

The RSRP is defined as the linear average value of power for resource elements transmitting the CRS, in the carrier frequency and measurement bandwidth (measurement frequency bandwidth) configured in the measurement object configuration. A resource $R_0$ to which the CRS is mapped is used to determine the RSRP. In a case that the terminal device can accurately detect the availability of $R_1$, $R_1$ may be used in addition to $R_0$ to determine the RSRP. Note that $R_0$ denotes a resource (resource element) for antenna port 0 for the CRS, and $R_1$ denotes a resource (resource element) for antenna port 1 for the CRS. The power for each of the resource elements may be determined from energy received between useful portions of the symbols except the CP.

The resource and the radio resource may be synonymous with a resource element or with a resource block or may be a resource element and/or a resource block in the subframe/slot and in the bandwidth.

For the RSRP, in a case that the higher layer indicates measurement based on the DS, the terminal device measures the RSRP in the subframes in the configured DS occasion (in the subframes constituting the DS occasion). In a case that the terminal device can accurately detect the presence of the CRS in other subframes (that is, subframes other than those included in the DS occasion), the terminal device may use the resource elements for the CRS in those subframes to determine the RSRP. That is, in a case that measurement of the RSRP is indicated using the CRS in the DS, the terminal device may measure the RSRP using the resources for the CRS mapped to the subframes inside the DS (inside the DS occasion) and to the subframes outside the DS (outside the DS occasion).

Note that a reference point for the RSRP is preferably an antenna connector of the terminal device. In a case that the terminal device uses reception diversity, a reported value will not be lower than the RSRP corresponding to any one of individual diversity branches. Moreover, the number of resource elements, used to measure the RSRP, in the measurement bandwidth and the measurement periodicity may be determined by the terminal device in a case that needed measurement accuracy is satisfied. The power for each of the resource elements is determined from energy received between effective portions of the symbols except the CP. The unit of the RSRP is dBm or W.

The RSRQ is a power ratio between the RSRP and the RSSI for the number of resource blocks corresponding to the measurement bandwidth for the RSSI. The measurement bandwidth for the RSRP and RSSI is constituted of resource blocks in the same set. The RSSI used to calculate the RSRQ and its histogram or the measured and reported RSSI may be separately measured.

The RSSI is obtained from particular OFDM symbols in the measurement bandwidth and the measured subframes, and includes a linear average value of total received power. The measurement bandwidth is the number N of resource blocks from all the sources by the terminal device. Moreover, all the sources may include common channel (co-channel) serving and non-serving cells, adjacent channel interference, and thermal noise. That is, the measurement of the RSSI may involve interference power and noise power.

The RSSI is measured on the OFDM symbols in the measured subframes, including the reference symbol for antenna port 0 in a case that no indication is provided by the higher layer. In a case that the higher layer indicates that the RSRQ measurement is performed using all the OFDM symbols, the RSSI is measured on all the OFDM symbols in the DL portion (downlink subframes and DwPTSs) of the measured subframes. In a case that the higher layer indicates that the RSRQ measurement is performed using particular OFDM symbols, the RSSI is measured on all the OFDM symbols in the DL portion (downlink subframes and DwPTSs) of the indicated subframes. That is, the OFDM symbols used for the RSSI measurement are determined based on the indication/configuration from the higher layer.

In a case that the higher layer indicates measurement based on the DS, the RSRQ is measured on all the OFDM symbols of the subframes in the configured DS occasion. The reference point for the RSRQ is the antenna connector of the terminal device. In a case that the terminal device uses reception diversity, the reported value will not be lower than the RSRQ corresponding to any one of the individual diversity branches. The unit of the RSRQ is dB.

The RSRP may be referred to as "CSI-RSRP" in a case that the measurement is performed using the resources for the CSI-RS. Note that the CSI-RSRP is defined as the linear average value of power for resource elements transmitting the CSI-RS and included in the measurement bandwidth of the subframes in the configured DS occasion. A resource $R_{15}$ to which the CSI-RS is mapped (resource for antenna port 15) is used to determine the CSI-RSRP. That is, to measure the CSI-RSRP, the terminal device measures the power for the resource to which $R_{15}$ is mapped, and linearly averages the measured power. Moreover, the reference point for the CSI-RSRP is the antenna connector of the terminal device. In a case that the terminal device uses reception diversity, the reported value will not be lower than the CSI-RSRP corresponding to any one of the individual diversity branches. The number of resource elements in the measurement periodicity and in the measurement bandwidth that are used to determine the CSI-RSRP may be determined according to the implementation of the terminal device in a case that the corresponding measurement accuracy is satisfied. That is, the terminal device may select and measure the resource elements in the measurement periodicity and in the measurement bandwidth in such a manner as to satisfy the measurement accuracy.

In a case that measurement results for the physical layer (first layer) are output to the higher layer, the measurement results may be filtered in the physical layer to acquire an average in the frequency direction (frequency resources in the measurement bandwidth (or in each resource block) in one subframe/one slot) and/or a time average in the subframe/slot (the time resources in the measurement bandwidth in one subframe/one slot). The filtering in the physical layer (first layer) is referred to as "first layer filtering". For example, the averaging of multiple input values, the averaging of weights, averaging following channel identification, and the like may be applied to the filtering in the physical layer. In addition, the measurement results filtered in the physical layer may further be filtered in the higher layer (third layer, RRC layer). The filtering in the higher layer (third layer) is referred to as "third layer filtering". For the third layer filtering, each of the measurement results received from the physical layer is calculated based on a filter coefficient. The filter coefficient is configured as a higher layer parameter. The filter coefficient may be configured in association with each of the RSRP, the RSRQ, and the CSI-RSRP. The filter coefficient may be configured as one of parameters for physical quantity configuration. In a case that higher layer parameters for the RSSI measurement are configured in the terminal device, the filter coefficient for the RSSI may be configured. Moreover, the filter coefficient for the RSSI may be configured as one of parameters for physical quantity configuration. The filter coefficient may also be referred to as "filtering coefficient".

The LAA cell may initiate communication after performing Listen Before Talk (LBT). The LBT involves, before the base station device and/or the terminal device performs transmission (communication) at the frequency corresponding to the LAA cell, detecting energy (or a signal) such as interference power (interference signal, received power, receive signal, noise power, noise signal), and based on whether the value of the energy (a power value for the signal is larger than a prescribed threshold, determining (identifying or detecting) whether the frequency is in the idle state (empty state (clear state), a non-congested state, a state where the frequency is not occupied by another signal, or a state where no other signal is present) or a busy state (a non-empty state, a congested state, a state where the frequency is occupied by another signal, or a state where another signal is present). In a case of determining that the frequency is in the idle state based on the LBT, the base station device or terminal device belonging to the LAA cell can transmit a signal at a prescribed timing. Moreover, in a case of determining that the frequency is in the busy state based on the LBT, the base station device or terminal device belonging to the LAA cell transmits no signal at the prescribed timing. Measurement relating to the LBT may be referred to as "Clear Channel Assessment (CCA)". That is, in the embodiments of the present invention, the LBT and the CCA may be synonymous with each other.

Now, an example of the CCA will be given.

A first CCA compares, during a certain measurement period (the period when the LBT and/or the CCA is performed), the value of detected energy with a prescribed threshold to determine whether the channel (frequency or cell) is clear. The first CCA may be referred to as "Energy Detection (ED) CCA".

A second CCA determines, during a certain measurement period, whether the channel is clear based on whether a signal has been detected to which a prescribed modulation scheme or sequence generation method is applied. The second CCA may be referred to as "Carrier Sense (CS) CCA".

A third CCA determines, during a certain measurement period, whether the channel is clear based on whether a signal has been detected to which a prescribed modulation scheme or sequence generation method (prescribed coding and modulation scheme) is applied and the value of energy of the detected signal is larger than a prescribed threshold. The third CCA may be referred to as "hybrid CCA".

In a case of detecting a signal for the LAA during a certain measurement period, the terminal device and/or base station device belonging to the LAA cell may determine that the channel is clear and transmit a signal.

Besides the above-described first to third CCAs, the CCA includes an initial CCA (ICCA, LBT category 2, single sensing, Frame-based equipment (FBE)) in which the CCA check is initially performed only once and an Extended CCA (ECCA, LBT category 3 or 4, multiple sensing, Load based equipment (LBE)) in which the CCA check is performed a prescribed number of times. The ICCA and the ECCA may each be combined with any of the first to third CCAs. The ICCA and the ECCA each indicate the period when the CCA check is performed (that is, the measurement period), and each of the first to third CCAs indicate a reference for determination of whether the channel is clear (that is, a threshold or a received power (energy) value). The ICCA and the ECCA may individually have the measurement period configured/defined for the ICCA and the ECCA. The ICCA is constituted of one measurement period, and the ECCA is constituted of multiple measurement periods. One measurement period may be referred to as "one measurement slot". For example, the measurement slot of the ICCA may have a length (size) of 34 microseconds. Moreover, the measurement slots of the ECCA may each have a length of 9 microseconds. Moreover, for the channel (frequency, cell), the period when the CCA check is performed after transition from the busy state to the idle state may be referred to as "defer period". The period may have a length of 34 microseconds. In a case that the terminal device performs the CCA (LBT), the base station device may perform configuration via higher layer signalling to determine which of the CCAs is to be used. The period when the CCA check is performed (CCA check period) may be referred to as "LAA collision window". The size of the collision window may be defined based on ECCA slots. Moreover, the size of the collision window may be changed between an X ECCA slot and a Y ECCA slot by backoff. Moreover, a value for the backoff may be dynamically or semi-statically changed. That is, the backoff value may be configured as one field in the DCI format or as a higher layer parameter.

The period when the CCA check is performed may be referred to as "LAA collision window". The size of the collision window may be defined based on ECCA slots. Moreover, the size of the collision window may be changed between the X ECCA slot and the Y ECCA slot by backoff. Moreover, a value for the backoff may be dynamically or semi-statically changed. That is, the backoff value may be configured as one field in the DCI format or as a higher layer parameter.

Now, report configuration and measurement reporting according to the present embodiment will be described.

The report configuration is a configuration indicative of prescribed conditions for reporting measurement results. The measurement reporting involves reporting the measurement results to the base station device in a case that the measurement results satisfy the conditions indicated in the report configuration. The reported measurement results are the measurement results obtained after the third layer filtering is performed as long as the higher layer provides no indication/configuration.

The report configuration includes a report configuration for the EUTRA associated with a report configuration identifier. The report configuration identifier may be defined for each RAT. That is, each of the report configuration for the EUTRA and the report configuration for the UTRA are associated with the report configuration identifier.

The report configuration includes an event ID, an event trigger condition corresponding to the event ID, a trigger physical quantity, a hysteresis, a time to trigger (TTT), a reporting amount physical quantity, a maximum number of reporting cells, a reporting interval, and a number of times of reporting, and the like.

A prescribed event ID is associated with a prescribed event trigger condition. An event ID of 1 may be associated with an event trigger condition of A1. These correspondence relationships are configured by the base station device and may be configured in the terminal device as higher layer parameters.

The event trigger condition may further have a corresponding threshold configured in the event trigger condition. The terminal device compares the result of measurement in a measurement object corresponding to the report configuration with the threshold included in the event trigger condition to determine whether to report the measurement result. The event trigger condition may simply be referred to as "event", or "event type" or "trigger type".

The trigger physical quantity is used to define the type of measurement result used for the event trigger condition. For example, in a case that the RSRP is configured as the trigger physical quantity, a threshold for the RSRP is also considered to be a power value, whereas the RSRQ is configured as the trigger physical quantity, a threshold for the RSRQ is also considered to be a power ratio. That is, the trigger physical quantity is used to determine which of the measurement results is used as a basis to satisfy the event trigger condition.

The reporting physical quantity is used to define the type of measurement result reported in a case that the event trigger condition is satisfied. The reported measurement result includes at least a measurement result configured based on the trigger physical quantity. In addition, the indication that different types of measurement results are to be reported may be configured by the reporting physical quantity.

The TTT is indicative of the period when a particular criterion for the event needs to be satisfied to trigger the measurement reporting.

The maximum number of reporting cells is indicative of the maximum number of cells included in the measurement reporting for the CRS, except the serving cell. That is, the maximum number of reporting cells is indicative of the maximum number of measurement results corresponding to the cells. The maximum number of reporting cells may be indicative of the maximum number of CSI-RS resources for the CSI-RS included in the measurement reporting for the CSI-RS.

The threshold may be configured for each of the RSRP and the RSRQ. In addition, in a case that measurement of the RSSI is indicated, a threshold for the RSSI may be configured.

The reporting interval defines the intervals of which periodical reporting and reporting based on an event. Note that measurement reporting periodically reported may be referred to as "trigger type periodical measurement reporting" and that event-based measurement reporting may be referred to as "trigger type event measurement reporting".

The number of times of reporting defines the number of times of measurement reporting applied to event-based reporting (trigger type events) as well as periodical reporting (trigger type periodical).

The measurement result compared with the threshold is the measurement result obtained after the third layer filtering is performed. However, in a case that the measurement result for the RSSI is compared (that is, in an event relating to the RSSI), the third layer filtering need not be applied.

For each event, two conditions (entering condition (entry condition), leaving condition) are defined. One of the conditions (entering condition) is a condition for performing the measurement reporting (initiating a measurement reporting procedure) in a case that the condition is satisfied, and the other (leaving condition) is a condition for deleting the measurement result from a list of measurement results to be reported in a case that the condition is satisfied.

The events include an event for the measurement reporting relating to the CRS, an event for the measurement reporting relating to the inter-RAT, and an event for the measurement reporting relating to the CSI-RS. A parameter indicative of a trigger condition such as a threshold is configured for each event.

In a case that the measurement reporting for the RSSI is performed, the events may additionally include an event for the measurement reporting relating to the RSSI. In a case that the measurement reporting for the RSSI is performed, the events including the event for the measurement reporting relating to the RSSI may be configured. That is, the report configuration may include the event for the measurement reporting relating to the RSSI. In this case, the trigger physical quantity and the reporting physical quantity, the threshold, the maximum number of reporting cells, the reporting interval, the number of times of reporting, the TTT, and the like may be configured as individual parameters (that is, parameters used only for the measurement reporting for the RSSI.

Now, the events for the measurement reporting relating to the RSSI according to the present embodiment will be described. Note that the RSSI includes the measured value of the RSSI.

Figure 5:
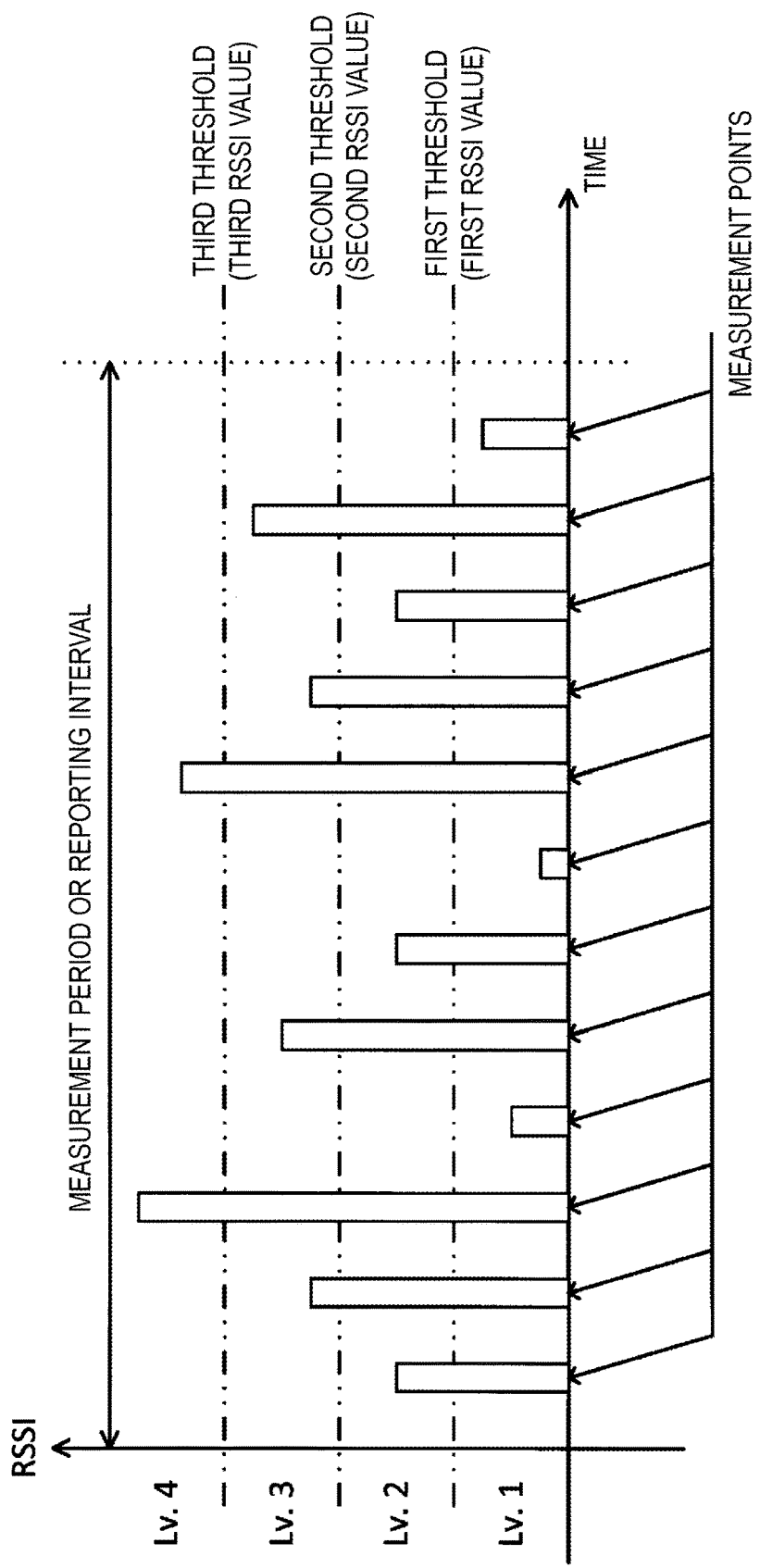
FIG. 5 is a diagram illustrating an overview of measurement points according to the first embodiment.

FIG. 5 is a diagram illustrating an overview of the report configuration according to the present embodiment. The vertical axis indicates the RSSI, and the horizontal axis indicates time. Note that as illustrated in FIG. 5, the RSSI may be classified into levels based on measured power (received power, an RSSI value) (e.g., Lv. 1 to Lv. 4 in FIG. 5). These levels are referred to as "power levels". Note that these levels may be referred to as "RSSI level" or "strength level". In a case that a prescribed number of measurement points are indicated in the measurement period or the reporting interval by the higher layer, the RSSI is measured at each of the measurement points. In a case that the prescribed condition is satisfied, the terminal device initiates a procedure for the measurement reporting. In a case that the prescribed condition is not satisfied, the measurement result corresponding to the measurement reporting need not be contained in the list of measurement results to be reported (measurement results to be reported to the base station device). That is, in a case that the prescribed condition is not satisfied, the terminal device need not report the measurement result to the base station device. Note that the measurement points may be referred to as "measurement bins". Note that in a case that the power levels are managed using a table, indices or values associated with the power levels may be configured.

In FIG. 5, in a case that the measurement period and/or the reporting interval is configured as a parameter for the report configuration, the measurement points within the measurement period may be represented based on the measurement resources for the RSSI configured in the measurement object corresponding to the report configuration. The measurement points may be represented by a prescribed bit sequence. The bits representing the measurement points may be set to "1". The RSSI may be measured at each measurement point. Each measurement point includes at least one measurement resource. Note that the measurement point may be constituted of one or more subframes. Each of the subframes in the measurement point may include at least one measurement resource. The RSSIs measured in the measurement points may be time-averaged (that is, the RSSIs are averaged in the time domain). At each measurement point, the total number of measurement resources used to measure the RSSI may be determined based on the length of the measurement point (e.g., the length of time (duration), the number of subframes or symbols (slots) in a time direction, or the like), and the measurement bandwidth (e.g., the number of resource blocks or resource elements (subcarriers) in a frequency direction), as well as the RSRP and the RSRQ. That is, the RSSIs at the measurement points may be frequency-averaged (that is, the RSSIs are averaged in the frequency domain). However, in a case that multiple subsets (subbands) are configured in the measurement bandwidth, the total number of measurement resources may be determined for each subband (within each subband). That is, in a case that the subbands are configured, the terminal device may measure the RSSI for each subband (e.g., the RSSI may be frequency-averaged for each subband).

FIG. 5 illustrates the measurement points spaced at intervals to facilitate description, but the measurement points may not be spaced at intervals. That is, the measurement points may be represented as a duration constituted of contiguous subframes (or symbols). In this case, the measurement resources may be periodically configured. Moreover, the measurement resources may be specific frequency resources for each of the symbols in the duration. That is, the RSSI may be measured at all the symbols.

Note that the length (duration) of the time domain at one measurement point may be configured as a measurement period. In this case, the RSSI may be measured for each of the different measurement resources in the time direction. Moreover, in this case, the time averaging using the measurement resources in one measurement point need not be performed. However, different measurement resources in the frequency domain mapped to the same time (symbol) may be frequency-averaged.

The time domain for the measurement points may be configured based on measured subframes (subframe offset) and the periodicity (note that the subframe offset corresponding to the periodicity may be used). Moreover, the time domain for the measurement points may be configured based on the subframe pattern (a bit sequence with a prescribed length). Moreover, the time domain for the measurement points may be configured only as a measurement period (measurement duration). The length of time at each measurement point (slot length) may be the same as the slot length in the CCA or as the length of one OFDM symbol. For example, assuming that the measurement period is 120 ms (120 subframes) and the length of time at each measurement point is equal to one OFDM symbol (NCP), the total number of measurement points in the time direction is 120×14 (that is, 1680) during the measurement period. In a case of performing the measurement reporting for the RSSI, the terminal device may use the 1680 points to generate a histogram corresponding to each power level.

In a first event, in a case that the percentage of measurement points, at which RSSIs equal to or higher than a prescribed power level (threshold) are measured, in a prescribed measurement period, is equal to or higher than a prescribed rate, the terminal device may perform the measurement reporting for the RSSI. Describing with reference to FIG. 5, in a case that the percentage of measurement points, at which the measured RSSIs are equal to or higher than the power level, Lv. 3 or higher (equal to or higher than second threshold), in a prescribed measurement period exceeds 50%, the terminal device may perform the measurement reporting for the RSSI. The measurement point may be the time measured at the measurement point.

As parameters for the first event, a prescribed measurement period or a prescribed number of measurement points, a prescribed power level used as a threshold, and a prescribed rate may be configured.

In a second event, in a case that during a prescribed measurement period, the RSSI equal to or higher than a prescribed power level (threshold) has been measured a prescribed number of times or more (for a prescribed time or longer), the terminal device may perform the measurement reporting for the RSSI. Note that in a case that the prescribed measurement period indicates infinity (indefinite period), the prescribed measurement period need not be configured in the report configuration.

In a third event, in a case that during a prescribed measurement period, the number of measurement points where the RSSI equal to or higher than a prescribed power level (threshold) measured is equal to or larger than a prescribed value, the terminal device may perform the measurement reporting for the RSSI. Note that in a case that the prescribed measurement period indicates infinity (indefinite period), the prescribed measurement period need not be configured in the report configuration.

In a fourth event, in a case that a comparison between a first measurement object (first frequency, first cell) and a second measurement object (second frequency, second cell) in the same length of measurement period indicates that the first measurement object (or the second measured object) involves more measurement points where the RSSI equal to or higher than a prescribed power level (threshold) has been measured, the terminal device may perform the measurement reporting for the RSSI.

In a fifth event, in a case of receiving a signal with a prescribed coding and modulation scheme (modulation scheme and sequence generation method) applied to the signal, the terminal device may perform the measurement reporting for the RSSI.

In a sixth event, in a case that the percentage of reception of signals with a prescribed coding and modulation scheme (modulation scheme and sequence generation method) applied to the signal in the prescribed measurement period is equal to or higher than a prescribed rate (for example, the percentage is equal to 50% or greater or the number of times of detection is equal to or more than a prescribed number of times), the terminal device may perform the measurement reporting for the RSSI.

In a seventh event, in a case that a prescribed reporting interval or measurement period has elapsed, the terminal device may perform the measurement reporting for the RSSI. That is, the report configuration may include the measurement period for the RSSI. A histogram of the RSSI for the measurement period may be generated.

The prescribed power level or higher described in the above event may be replaced with a prescribed power level or lower. Or power level lower than a prescribed power level. Note that the RSSI may be within the prescribed power level (that is, the RSSI may be the same as the prescribed power level).

In a case that the condition for any one of the events included in the report configuration is satisfied, the terminal device reports the measurement results (that is, the terminal device initiates the measurement reporting procedure).

Note that the event for the measurement reporting relating to the RSSI may be referred to as "EUTRA measurement reporting event for CSI-IM resources" (that is, the CSI-RS with zero power). That is, with the event configured, the terminal device measures the RSSI for the CSI-IM resources, and in a case that the condition is satisfied, reports the results of the measurement (the measurement results indicated by the report configuration).

Moreover, the event for the measurement reporting relating to the RSSI may be referred to as "EUTRA measurement reporting event for resources with no transmission of the DS (the subframes or symbols other than those included in the DS occasion)". That is, with the event configured, the terminal device measures the RSSI for the resources with no transmission of the DS, and in a case that the condition is satisfied, reports the results of the measurement (the measurement results indicated by the report configuration).

Moreover, the events for the measurement reporting relating to the RSSI may be referred to as "EUTRA measurement reporting event for resources with no transmission from the base station device (e.g., guard time or guard period, measurement gap, and the like)". That is, with the event configured, the terminal device measures the RSSI for the resources indicated that there is no transmission from the base station device, and in a case that the condition is satisfied, reports the results of the measurement (the measurement results indicated by the report configuration).

Moreover, the event for the measurement reporting relating to the RSSI may be referred to as "EUTRA measurement reporting event relating to resources in the PSS/SSS (6 RBs provided for the PSS/SSS) in which the PSS/SSS is not transmitted". That is, with the event configured, the terminal device measures the RSSI for the resources with no transmission of the PSS/SSS, and in a case that the condition is satisfied, reports the results of the measurement (the measurement results indicated by the report configuration).

Moreover, the event for the measurement reporting relating to the RSSI may be referred to as "EUTRA measurement reporting event for guard bands (that is, frequency resources (resource blocks) not used for transmission by the base station device)". Note that the guard band is represented by a difference between the system bandwidth and the measurement bandwidth/transmission bandwidth. For example, in a case that the system bandwidth is 20 MHz, while the measurement bandwidth/transmission bandwidth is 18 MHz, 1 MHz at each of both ends of the band is used as a guard band (a total of 2 MHz).

Moreover, the event for the measurement reporting relating to the RSSI may be referred to as "EUTRA measurement reporting event for the CRS with zero power". For example, an antenna port used for the CRS with zero power may be indicated in the measurement object configuration. The CRS (particularly the resource for antenna port 0) is transmitted in all the subframes unless otherwise limited, even in a case that the PDCCH or the PDSCH is not transmitted from the base station device. The resource for one of the antenna ports is configured as a resource with zero power to allow interference power and noise power or the RSSI to be measured in all the subframes. In a case that the measurement need not be performed in all the subframes, the RSSI measurement may be limited using the measured subframe pattern, the measurement periodicity (measurement period), or the like.

Moreover, the event for the measurement reporting relating to the RSSI may be referred to as "EUTRA measurement reporting event for the UERS with zero power". For example, an antenna port used for the UERS with zero power may be indicated in the measurement object configuration. At the antenna port used for the UERS with zero power, interference power and noise power or the RSSI may be measured. Moreover, with the periodicity, the subframe offset, and the duration configured to overlap the DMTC and/or the DS occasion, the terminal device can measure interference power and noise power including no transmit power from the base station device (that is, the RSSI including interference power and noise power) in the DMTC and/or the DS occasion.

Moreover, the event for the measurement reporting relating to the RSSI may be referred to as "EUTRA measurement reporting event for a Positioning Reference Signal (PRS) with zero power". For example, the measurement object configuration may include a parameter used for the frequency offset. Compared to the CRS and the CSI-RS, the PRS has more resources included in one subframe (both in the frequency domain and in the time domain). The use of the PRS resource with zero power allows interference power and noise power including no transmit power from the base station device (that is, the RSSI including interference power and noise power) to be measured all over each of the frequency domain and the time domain.

Moreover, the event for the measurement reporting relating to the RSSI may be referred to as "EUTRA measurement reporting event for the OFDM symbols with zero power (or specific OFDM symbols)". In the OFDM symbols with zero power, no downlink signal is transmitted from the connected base station device, and thus, the terminal device can measure interference power and noise power including no transmit power from the base station device (that is, the RSSI including interference power and noise power). At the same time, the base station device can measure interference power and noise power and recognize hidden terminals by matching the measurement results against the measurement results from the terminal device.

Moreover, the event for the measurement reporting relating to the RSSI may be referred to as "EUTRA measurement reporting event for the subframes with zero power (or specific subframes)". Interference power and noise power can be measured by measuring the RSSI in each of the OFDM symbols included in the subframes with zero power. At the same time, the base station device can measure interference power and noise power and find hidden terminals by checking the measurement results against the measurement results from the terminal device. Measurement of the RSSI for a moderately long period enables a reduction in the possibility of missing hidden terminals.

Moreover, the event for the measurement reporting relating to the RSSI may be referred to as "EUTRA measurement reporting event for slots on which the terminal device and the base station device simultaneously performs the CCA check". Note that the CCA check may be replaced with measurement of interference and noise. While the base station device is performing the CCA check, the base station device transmits no downlink signal with respect to the corresponding cell (channel, frequency, or component carrier). That is, during that period, the terminal device can measure interference power and noise power including no transmit power from the base station device by executing the CCA check.

Moreover, the event for the measurement reporting relating to the RSSI may be referred to as "EUTRA measurement reporting event for the measurement points for the RSSI measurement". The time/frequency resources for the measurement points may be configured based on the measurement object configuration. Definition of the measurement points for the RSSI measurement allows the base station device to recognize hidden terminals even in a case that the base station device transmits a downlink signal at any of the measurement points, by excluding the measurement results for the measurement point.

In a case that these resources are used as resources for measuring the RSSI, no downlink signal is transmitted from the base station device connected to the terminal device, thus allowing measurement of the power of signals transmitted from adjacent cells, any other RAT, WiFi node, and the like (that is, interference power and noise power). These measurement results are reported to the connected base station device to allow the base station device to recognize hidden terminals.

That is, the event for the measurement reporting relating to the RSSI may be performed based on the resources used to measure the RSSI (interference and noise).

The resources associated with the events may be configured based on the parameters included in the measurement object configuration.

Now, the measurement result reported in a case that the condition for performing the measurement reporting is satisfied in the above-described events will be described.

The reported measurement result may be a parameter indicating that the condition is satisfied (e.g., TRUE).

Moreover, the reported measurement result may be the percentage of the measurement points (or the measurement time) corresponding to power levels in the measurement period during the measurement period. In other words, the reported measurement result is the number of times of measurement of the RSSI included in each power level (the number of measurement points) during the measurement period. For example, with reference to FIG. 5, the number of measurement points for each power level during the measurement period is 3, 3, 4, and 2 in order of increasing power level from level 1. The terminal device may report the number of measurement points for each power level (or the percentage of the number of measurement points corresponding to each power level in the total number of measurement points) in the measurement reporting. Such information, during a certain measurement period, indicative of the number (percentage) of measurement points corresponding to each power level is referred to as "histogram". For example, in a case that the percentage corresponding to each power level is expressed using 8 bits, the percentage corresponding to each power level is expressed by CEILING (($2^8-1$)×the number of measurement points corresponding to each power level (or the total time when each power level is detected)/the total number of measurement points within the measurement period (total measurement time, measurement duration). By way of example, in a case that the total time when the first power level (Lv. 1) is detected during a measurement time of 100 ms, the percentage corresponding to the first power level is calculated to be a value indicative of $1/100$ (or 1%) (or a bit sequence corresponding to the value) or a bit value. A similar calculation is performed for each power level. The percentage corresponding to each power level may be calculated in such a manner that adding up the percentages corresponding to all the power levels results in a value or a bit value corresponding to 1 (or 100%). However, adding up the percentages corresponding to all the power levels may fail to result in 1 or 100%. The bit value is determined based on the total number of bits constituting the histogram. For example, for 8 bits, the bit value may be configured to be 0 to 255 and each value may be associated with a percentage (or %).

Moreover, the reported measurement result may be the number of measurement points exhibiting a power level equal to or higher than the threshold.

Moreover, the reported measurement result may be a bit sequence indicative of the measurement points with the power levels detected at the measurement points. With reference to FIG. 5, 12 measurement points are present in the measurement period. For example, to indicate measurement points with level 4 detected at the measurement points, a bit sequence like "001000010000" may be set as a measurement result. Bit sequences corresponding to the respective power levels may be included in the measurement result. Moreover, the bit sequence may be indicating measurement points where an RSSI value equal to or larger than a threshold (prescribed RSSI value) or equal to or smaller than the threshold (prescribed RSSI value) (or smaller than the threshold) is detected instead of the power level. For example, with reference to FIG. 5, to indicate measurement points with an RSSI value equal to or larger than a first threshold, a bit sequence like "111011011111" may be set as a measurement result.

A ratio for the power levels measured during the measurement period may be managed using a table and/or indices. For example, an index (e.g., index 1) corresponding to a first ratio for levels 1 to 4 (e.g., 3:3:4:2) may be defined.

These measurement results may be used by the base station device to recognize hidden terminals around the terminal device. That is, these measurement results may be used to detect terminals that are not recognized by the base station device. Note that the hidden terminals refer to terminals that fail to be recognized based on the measurement of interference power/noise power or the CCA check by the base station device and/or the CSI reporting from the terminal device. In a case that the base station device performs scheduling without recognizing the hidden terminals, signals transmitted from the hidden terminals cause interference with the terminal device or noise, thus reducing communication efficiency. The base station device can recognize the hidden terminals by matching the measurement results from the base station device against the measurement results from the terminal device. The hidden terminals may include access points, base station devices, and other terminal devices.

Now, the configuration for the RSSI included in the measurement object configuration according to the present embodiment will be described.

The measurement object is configured to indicate frequencies, resources, and timings at which the measurement relating to the EUTRA is performed.

In a case that the measurement object configuration includes a configuration relating to the RSSI, the terminal device may measure the RSSI using the resources indicated by the configuration. The resources may be resources indicative of measurement points.

The configuration relating to the RSSI may include a configuration for resources used for the CSI-IM. That is, the configuration relating to the RSSI may include a configuration relating to CSI-RS resources with zero power. The base station device transmits no downlink signal (for example, the CSI-RS) in the CSI-RS resources with zero power used for the configured CSI-IM. The terminal device measures interference power/noise power or the RSSI in the resources for the configured CSI-IM. Note that parameters include a configuration for frequency resources (a configuration for the resources in the frequency direction), the subframe offset and the measurement periodicity, the pattern of subframes used for the measurement (a configuration for resources in the time direction), and the like. These CSI-IM resources may be listed. The configuration relating to the CSI-IM resources may be associated with an ID relating to the RSSI measurement (e.g., a CSI-IM configuration ID).

In a case that the configuration and/or list of the resources for the CSI-IM used for the RSSI measurement is included in the measurement DS configuration, the CSI-IM resources may be mapped to some or all of the subframes in the DS occasion duration.

Note that in a case that multiple CSI-IM resources are mapped in one subframe, the RSSI values of the respective resources may be linearly averaged. Moreover, in a case that multiple CSI-IM resources are mapped in one subframe, the RSSI values of the respective resources need not be linearly averaged in a case that the resources are mapped to different symbols. The number of measurement points may be determined to increase accordingly.

Moreover, the configuration relating to the RSSI may include a parameter (symbol pattern or subframe pattern) indicative of a symbol and/or a subframe in which the measurement relating to the RSSI is performed. Note that a parameter indicative of a symbol and a parameter indicative of a subframe may be independently configured. Which of the symbols and which of subframes are targets in which the measurement relating to the RSSI is to be performed may be indicated based on the two parameters. With only the parameter indicative of a symbol, the RSSI measurement may be performed at that symbol in all the subframes. With only the parameter indicative of a subframe, the RSSI measurement may be performed at all the symbols in that subframe. Note that preferably the measured subframe pattern relating to the RSSI is configured separately from a measured subframe pattern for neighbor cells included in the same measurement object configuration, and is different from the measured subframe pattern for neighbor cells. That is, none of the subframes in the measured subframe pattern relating to the RSSI preferably overlap the subframes in the measured subframe pattern for neighbor cells.

In a case that the configuration relating to the RSSI is included in the measurement object configuration with the same frequency as PCell, preferably the measured subframe pattern relating to the RSSI is configured separately from a measured subframe pattern for the PCell and is different from the measured subframe pattern for the PCell. That is, none of the subframes in the measured subframe pattern relating to the RSSI preferably overlap the subframes in the measured subframe pattern for the PCell.

Moreover, the measurement subframe pattern relating to the RSSI may be associated with the measurement period. For example, in a case that the measurement period is 40 ms (40 subframes), the measured subframe pattern relating to the RSSI may be expressed using 40 bits. Moreover, in a case that the measurement period is 80 ms (80 subframes), the measured subframe pattern relating to the RSSI may be expressed using 80 bits. That is, the number of bits used for the measured subframe pattern (the length of the bit sequence) may be determined according to the measurement period. Moreover, the length of the measurement period may be determined according to the number of bits used for the measured subframe pattern (the length of the bit sequence).

Moreover, in a case that the measured subframe pattern relating to the RSSI and the measurement period are individually configured, the measurement period is preferably an integral multiple of the total number of subframes used in the measured subframe pattern. For example, in a case that the total number of subframes used in the measured subframe pattern is 10 (that is, in a case that the measured subframe pattern is expressed using a bit sequence of 10 bits), the measurement period is preferably 10×n (n is an integer). The same pattern is repeated within the same measurement period.

Note that although the measured subframe pattern relating to the RSSI has been described by way of example, a measurement symbol pattern may similarly be configured.

The configuration relating to the RSSI may include a configuration for resources used for the RSSI measurement. The configuration for the resources may include a parameter indicative of measured subframes (or measurement symbols) and measurement periodicity and a parameter used to identify time or frequency resources (a parameter for identifying resource elements with the resources mapped to the resource elements).

Moreover, the configuration relating to the RSSI may include a parameter indicating whether measurement is performed in resources in which no DS is transmitted. In a case that the parameter indicates that measurement is to be performed, the terminal device measures the RSSI in the resources (OFDM symbols or subframes) in which no DS is transmitted. In a case that the subframes or OFDM symbols in which the measurement is to be performed have been determined, a parameter indicative of the subframes or the OFDM symbols may be set as the configuration relating to the RSSI. Moreover, subframes in the DS occasion to which no DS is mapped may be determined to be measured subframes.

Moreover, in a case that the configuration relating to the RSSI is included in the measurement DS configuration, the terminal device may measure the RSSI in some or all of the subframes using resources with no DS mapped to the resources. For example, the measurement resources and the measurement points may be specific resources for all the OFDM symbols in the DS occasion. In a case that the DS occasion is constituted of 6 subframes (NCP) and all the OFDM symbols in all the subframes are measurement points, the terminal device may measure the RSSI in each of 6×14=84 points to generate a histogram corresponding to the level of the RSSI. The terminal device may classify the measurement results for the RSSI at the respective points into levels to generate a corresponding histogram.

Moreover, the configuration relating to the RSSI may include parameters indicative of resources for the CRS with zero power. For example, the configuration relating to the RSSI may include a parameter indicative of resources for the CRSs not used by the own cell and a parameter indicating that resources other than the CRS used by the own cell are to be measured. The parameters indicative of resources may include a parameter indicative of an offset in the frequency direction, a subframe pattern, and the like.

Moreover, the configuration relating to the RSSI may include parameters indicative of resources for the UERS with zero power. For example, the configuration relating to the RSSI may include a parameter indicative of resources for the UERSs not used by the own cell and a parameter indicating that resources other than the UERS used by the own cell are to be measured. The parameters indicative of resources may include a parameter indicative of an offset in the frequency direction and a subframe pattern.

Moreover, the configuration relating to the RSSI may include parameters indicative of resources for the PRS with zero power. For example, the configuration relating to the RSSI may include a parameter indicative of resources for the PRSs not used by the own cell and a parameter indicating that resources other than the PRS used by the own cell are to be measured. The parameters indicative of resources may include a parameter indicative of an offset in the frequency direction and a subframe pattern.

Moreover, the configuration relating to the RSSI may include a parameter indicative of OFDM symbols or subframes with zero power (or particular OFDM symbols or subframes). For example, the configuration relating to the RSSI may include a parameter indicative of OFDM symbols or subframes with zero power. Like the subframe pattern, the parameter may be represented using a bit sequence.

Moreover, the configuration relating to the RSSI may include a parameter indicating whether the guard time/guard period is measured. The configuration relating to the RSSI may include a parameter indicative of a specific guard time/guard period. Several symbols (one or more symbols) between a DL transmission (DL burst) and a UL transmission (UL burst) may be set as a guard time/guard period. Note that the terminal device does not expect that a downlink signal is transmitted from the base station device (cell) RRC-connected to the terminal device, in the guard time/guard period defined as a parameter for the RSSI measurement. That is, the RSSI measured in the guard time/guard period corresponds to interference power and noise power from other nodes or cells. In the guard time/guard period, the base station device and the terminal device may simultaneously measure the RSSI or the CCA or power.

Moreover, the configuration relating to the RSSI may include a parameter indicating whether to measure the guard band. For example, the configuration relating to the RSSI may include a parameter used to limit the measured subframes.

From FIG. 5, the configuration relating to the RSSI may be a configuration for resources used for measurement points. For example, the configuration relating to the RSSI may include a parameter indicative of resources in the frequency direction (e.g., a frequency offset, a subcarrier offset, and a resource element offset) used for the measurement points, a parameter indicative of resources in the time direction (e.g., a subframe offset, the periodicity, and a symbol offset) used for the measurement point.

In a case that the carrier frequency included in the measurement object configuration belongs to a prescribed frequency or a prescribed operating band, the terminal device may measure the RSSI to be subjected to the measurement reporting (or the RSSI used to generate a histogram).

Multiple configurations relating to the RSSI may be set in one measurement object configuration. That is, the configurations relating to the RSSI may be listed. The list of the configurations relating to the RSSI may include IDs corresponding to configurations relating to the respective RSSIs. That is, the configurations may have a correspondence relationship with the IDs.

Moreover, the configuration relating to the RSSI may be referred to as "configuration relating to a histogram". The configuration relating to the RSSI may include not only parameters used to measure the RSSI but also a parameter used to generate a histogram. Moreover, the configuration relating to the RSSI may include a parameter indicative of the measurement points for the RSSI as illustrated in FIG. 5. That is, the configuration relating to the RSSI may include a parameter used to configure frequency resources and measurement timings indicative of the measurement points.

Moreover, the configuration relating to the RSSI may include a measurement period used to generate a histogram. This corresponds to the measurement period illustrated in FIG. 5. The total number of measurement points may be determined based on the measurement period and the measurement resources.

Note that the configuration relating to the RSSI may not be included in the measurement object configuration. For example, in a case that the carrier frequency (a frequency configured by the carrier frequency) included in the measurement object configuration belongs to the operating band for the LAA, the terminal device may measure the RSSI using prescribed measurement resources and classify the measured RSSIs into levels as needed to generate a histogram. The base station device may be able to determine whether the measurement result reported is the measurement result for the RSRQ or the measurement result based on the RSSI (e.g., a histogram corresponding to the RSSI level), in accordance with the configured carrier frequency and based on the report configuration associated with the measurement object configuration.

For example, the terminal device may generate the histogram relating the RSSI only in a case that periodical reporting is configured in the report configuration associated with the measurement object configuration including the configuration relating to the RSSI. The reported histogram may not cover all the levels. That is, only a histogram covering particular levels may be reported. Which levels in the histogram are reported may be determined based on a parameter included in the report configuration. Note that the periodical reporting may be newly configured to allow the measurement relating to the RSSI to be performed. That is, the periodical reporting may be configured as periodical reporting relating to the RSSI. For example, the purpose of the periodical reporting may not be to report the strongest cell or the Cell Global Identifier (CGI). Moreover, the purpose of the periodical reporting may be to report a histogram or measurement results relating to the RSSI.

In a case that the configuration relating to the RSSI includes the measurement period during which a histogram is generated, the RSSI may be measured in the OFDM symbols within the measurement period and the results of the measurement may be classified into levels to generate a histogram for each level.

In a case that the measurement configuration includes the measurement period during which a histogram is generated, the RSSI used to generate a histogram may be measured only in the measurement object including a prescribed carrier frequency. That is, whether to measure the RSSI used to generate a histogram may be determined based on the carrier frequency.

Note that the parameter used to generate a histogram as described above may be a parameter used to generate a bit sequence for the measurement points corresponding to the levels.

The terminal device may determine whether to measure only the RSSI for the RSRQ and further whether to measure the RSSI for a histogram or the like which is used to detect hidden terminals, depending on whether the measurement object configuration includes a configuration relating to the RSSI and whether the associated report configuration indicates that measurement results relating to the RSSI are to be reported. In addition, the terminal device may determine whether to measure the RSRQ for the CSI-RSRP depending on whether the measurement DS configuration is included in the measurement object configuration.

Now, a measurement procedure according to the present embodiment will be described.

For all the measurements, the terminal device applies the third layer filtering to measurement results before using the measurement results for evaluation for reporting criteria (that is, for the event in the report configuration) or for the measurement reporting. That is, for all the measurements, the terminal device filters the measurement results using a filter coefficient based on a physical quantity configuration.

In a case that a measurement configuration is available (that is, in a case that the parameters included in the measurement configuration are set), the terminal device performs RSRP measurement and/or RSRQ measurement for each serving cell.

In a case that a measured subframe pattern for the PCell is configured for the PCell, the terminal device may limit the measured subframes based on the measured subframe pattern for the PCell. In a case that the measured subframe pattern is not configured, the terminal device performs the RSRP and/or RSRQ measurement for the PCell in each subframe. Note that measurement resources used for the RSRP and/or RSRQ measurement include the CRS (resources for the CRS).

In a case that the terminal device performs DS measurement based on the CRS and the measurement DS configuration is configured in the measurement object corresponding to the frequency of the SCell (that is, the SCell in which the measurement reporting is performed), the terminal device applies the DMTC associated with the measurement DS configuration to each SCell in a deactivated state. That is, the terminal device performs the DS measurement based on the CRS for each SCell in the deactivated state at the frequency configured as the measurement object including the DMTC, based on the DMTC.

In a case that the indication that the Cell Global Indicator (CGI) is to be reported is set as a purpose for the associated report configuration for each measurement ID included in a measurement ID list in a variable measurement configuration and that a system information request for handover is configured in the associated report configuration, a needed autonomous gap is used to perform the corresponding measurement in the frequency and RAT indicated in the associated measurement object. Otherwise, the needed autonomous gap or an effective idle period is used to perform the corresponding measurement in the frequency and RAT indicated in the associated measurement object.

Note that the variable measurement configuration includes an accumulated configuration for the measurement performed by the terminal device, covering the measurement associated with intra-frequency, inter-frequency, and inter-RAT mobility.

In a case that a first condition or a second condition is satisfied, the terminal device performs the corresponding measurement for the CSI-RS resource at the frequency indicated in the associated measurement object. The DMTC based on the measurement DS configuration for the associated measurement object is applied to the CSI-RS resource.

In a case that the first condition or the second condition is satisfied and a third condition is satisfied, the terminal device performs the corresponding measurement for neighbor cells at the frequency indicated by the associated measurement object. The terminal device performs the measurement in the measured subframes limited based on the measured subframe pattern for the neighbor cells operating at a primary frequency, in a case of being configured by the associated measurement object. Moreover, the DMTC associated with the measurement DS configuration in the associated measurement object may be applied.

Note that the first condition is that a measurement gap configuration is set, the second condition is that there is no need for a measurement gap used to allow the terminal device to perform the associated measurement, and the third condition is that the associated report configuration includes the indication that the measurement results relating to the measured CRS are to be reported. The second condition further includes any of conditions A to C. Condition A is that a PCell quality threshold (s-Measure) is not configured. Condition B is that the PCell quality threshold is configured and that the RSRP of the PCell is lower than the threshold after the third layer filtering. Condition C is that the measurement DS configuration is configured in the associated measurement object, and the terminal device supports the DS measurement based on the CSI-RS, and the event ID of the associated report configuration is set for the event relating to the CSI-RS or that the maximum value of the measurement results for the CSI-RS is indicated to be reported. In the other cases, the corresponding measurement for the neighbor cells is performed in the frequency and RAT indicated as the associated measurement object. In a case that the neighbor cells operating at the primary frequency are configured as the associated measurement object, the measurement is performed in the measured subframes limited based on the measured subframe pattern for the neighbor cells.

In a case that the terminal device performs the measurement relating to the RSSI and in the configuration relating to the RSSI, the frequency corresponding to the frequency of the SCell is configured in the measurement object, the terminal device performs the RSSI measurement using the measurement resources associated with the configuration relating to the RSSI, for each SCell in the activated state and/or the deactivated state. For example, the measurement resources may be determined based on the measured subframe pattern and/or the measurement symbol pattern or may be determined based on the associated configuration included in the measurement object configuration.

Moreover, in a case that the terminal device performs the measurement relating to the RSSI and the frequency corresponding to the frequency of the SCell is configured in the measurement object, and the frequency is a prescribed frequency (and belongs to a prescribed operating band), the terminal device performs the RSSI measurement using the associated measurement resources for each SCell in the activated state and/or the deactivated state.

In a case that the measurement results for the RSSI are not used for the measurement results for the RSRQ, the terminal device may use the measurement results for the RSSI to generate a histogram indicative of occupancy time (occupancy rate or percentage) for each level of the RSSI during the measurement period.

Now, a measurement reporting procedure according to the present embodiment will be described.

The measurement reporting is intended to transmit measurement results from the terminal device to a network (base station device, EUTRAN).

For the measurement ID for which the measurement reporting procedure is triggered, the terminal device sets the measurement results in a measurement reporting message.

The measurement ID for which the measurement reporting is triggered is set in the measurement reporting message.

The measurement results for the PCell are set in the measurement reporting message.

A list of measurement results for a serving frequency included for each SCell configured in the measurement results for the SCell may be set in the measurement reporting message.

In a case that the report configuration associated with the measurement ID for which the measurement reporting is triggered includes supplemental reporting of the measurement results for the neighbor, a list of measurement results for serving frequencies included in the best measurement result for the neighbor cells is set for the serving frequencies for measurement object IDs referenced in the measurement ID list, the serving frequencies being other than the frequency corresponding to the measurement ID for which the measurement reporting is triggered. The list includes physical cell IDs and physical quantities for the measurement results for the best serving cell based on the RSRP in the associated serving frequencies.

In a case that at least one appropriate neighbor cell is to be reported, the terminal device sets the measurement results for the neighbor cells including a neighbor cell with the best measurement result, up to the maximum number of cells receiving reporting. In a case that the trigger type is set to the event, the best neighbor cell may include any of the triggered cells defined in a variable measurement reporting list for the measurement IDs.

The best neighbor cell may include an appropriate cell to which new measurement results are applied after the last periodical reporting or after the measurement is initiated or reset.

In a case that at least one appropriate CSI-RS resource is to be reported, the terminal device sets the list of the measurement results for the CSI-RS, the list including a CSI-RS resource with the best measurement result, up to the maximum number of cells receiving reporting. In a case that the trigger type is set to the event, the best CSI-RS resource may include any of the CSI-RS resources included in a list of triggered CSI-RSs defined in the variable measurement reporting list for the measurement IDs.

The best CSI-RS resource may include an appropriate CSI-RS resource to which new measurement results are applied after the last periodical reporting or after the measurement is initiated or reset.

A measurement CSI-RSID may be included for each of the CSI-RS resources included in the list of the measurement results relating to the CSI-RS. Moreover, measurement results may be included that are obtained after the third layer filtering associated with the report configuration for the measurement IDs.

The terminal device may set, in the measurement reporting message, the measurement results for the CSI-RSRP including the physical quantity indicated by the reporting physical quantity in the associated report configuration, in order of decreasing trigger physical quantity relating to the CSI-RS (that is, in a case that the best CSI-RS is placed first in the list).

In a case that the indication that the measurement results for the CRS are to be reported is included in the associated report configuration and the cell indicated by the physical cell ID of the corresponding CSI-RS resource is not the serving cell, the terminal device may set the measurement results for the neighbor cells including the cell indicated by the physical cell ID of the CSI-RS resource and the physical cell ID. Moreover, the terminal device may set the measurement results for the RSRP including the RSRP of the associated cell, in the measurement reporting message. That is, the measurement results are reported together with the cell ID of the associated cell.

In a case that the indication that the measurement results for the RSSI are to be reported is included in the associated report configuration (that is, in a case that a parameter indicating that the measurement results for the RSSI are to be reported is configured in the report configuration), the terminal device may set the physical cell ID and the measurement results relating to the RSSI of the cell indicated by the associated physical cell ID, in the measurement reporting message.

In a case that the indication that the measurement results for the RSSI are to be reported is included in the associated report configuration (that is, in a case that the parameter indicating that the measurement results for the RSSI are to be reported is configured in the report configuration), and the RSSI is measured based on the CSI-IM resource, the terminal device may set the measurement results relating to the RSSI including the resource indicated by the associated CSI-IM configuration ID and the CSI-IM configuration ID, in the measurement reporting message. That is, the measurement results may be reported together with the configuration ID of the associated CSI-IM resource.

In a case that the indication that the measurement results for the RSSI are to be reported is included in the associated report configuration (that is, in a case that a parameter indicating that the measurement results relating to the histogram based on the RSSI are to be reported is configured in the report configuration), the terminal device may set the ID associated with the configuration relating to the associated RSSI and the measurement results relating to the histogram based on the RSSI, in the measurement reporting message.

A communicable range (communication area) at each frequency controlled by the base station device is assumed to be a cell. Here, the communication area covered by the base station device may be different in size and shape for each frequency. Moreover, the covered area may be different for each frequency. A radio network in which cells having different types of base station devices and different cell radii coexist in the area on the same frequency and/or different frequencies to form a single communication system is referred to as "heterogeneous network".

The terminal device has no connection established with any network immediately after being switched on (e.g., in a case of activation), for example. Such a state without connection is referred to as "idle mode (RRC_IDLE)". To perform communication, the terminal device in the idle mode needs to establish connection with any network. That is, the terminal device needs to be in the connected mode (RRC_CONNECTED). Here, the network may include a base station device, an access point, a network server, a modem, and the like that belong to the network.

Then, to perform communication, the terminal device in the idle mode needs to perform Public Land Mobile Network (PLMN) selection, cell selection/re-selection, location registration, manual selection of a Closed Subscriber Group (CSG) cell, and the like.

In a case that the terminal device is switched on, a PLMN is selected by a Non-Access Stratum (NAS). For the selected PLMN, an associated radio access technology (RAT) is set. The NAS provides a list of equivalent PLMNs, in a case that the list is available, so that an Access Stratum (AS) uses the list for cell selection/re-selection.

With the cell selection, the terminal device searches for a suitable cell of the selected PLMN, and selects a cell to provide available services (serving cell). Furthermore, the terminal device tunes to its control channel. Such selection is referred to as "camping on the cell".

The terminal device, depending on the need, uses a NAS registration procedure to register its presence (information on a selected cell and information on a tracking area) in the tracking area of the selected cell as an outcome of a successful location registration which causes the selected PLMN to be the registered PLMN.

In a case of finding a more suitable cell, the terminal device re-selects the cell according to cell re-selection criteria and camps on the cell. In a case that a new cell does not belong to at least one tracking area to which the terminal device has been registered, location registration for the new cell is performed.

Depending on the need, the terminal device searches for higher priority PLMNs at regular time intervals, and searches for a suitable cell in a case that another PLMN has been selected by the NAS.

Search of available CSGs may be triggered by the NAS to support manual CSG selection.

In a case of losing coverage of the registered PLMN, the terminal device may allow a user to configure either automatic selection of a new PLMN (automatic mode) or manual selection in which an indication of which PLMNs are available is given to the user (manual mode). However, in a case of receiving a service not requiring registration, the terminal device need not perform such registration.

The following (A1) to (A5) are the purposes of the terminal device in an idle mode to camp on a cell.

(A1) It enables the terminal device to receive system information from the PLMN (or EUTRAN).

(A2) In a case that the terminal device is registered and wishes to establish an RRC connection, the terminal device performs an initial access to the network on the control channel of the cell on which the terminal device is camped.

(A3) In a case of receiving a call for the registered terminal device, the PLMN knows a set of tracking areas in which the terminal device camps (i.e., camped cells). The PLMN can then transmit a "paging message" for the terminal device on control channels of all the cells in this set of tracking areas. The terminal device then tunes to the control channel of one of the cells in the registered tracking areas, enabling the terminal device to receive the paging message and respond to the control channel.

(A4) It enables the terminal device to receive notifications of Earthquake and Tsunami Warning System (ETWS) and Commercial Mobile Alter System (CMAS).

(A5) It enables the terminal device to receive Multimedia Broadcast-Multicast Services (MBMSs).

In a case that the terminal device is unable to find a suitable cell to camp on or the location registration fails, the terminal device attempts to camp on a cell irrespective of the PLMN identity and enters a "limited service" state. Here, the limited service includes an emergency call, ETWS, CMAS, and the like in a cell satisfying a condition. On the other hand, a normal service is provided for public use in a suitable cell. An operator-specific service and the like are also provided.

In a case that the NAS indicates the start of a power saving mode (PSM), an access stratum (AS) configuration is maintained and all the timers in operation continue to operate; however, the terminal device need not perform an idle mode task (e.g., PLMN selection, cell selection/re-selection, and the like). In a case that a certain timer expires with the terminal device in the PSM, it depends on an implementation of the terminal device whether the last process at the end of the PSM is performed or a corresponding process is immediately performed. In a case that the NAS indicates the end of the PSM, the terminal device performs all the idle mode tasks.

The terminal device operates by assuming the inside of a cell as a communication area. In a case that the terminal device moves from a cell to another cell, the terminal device moves to another suitable cell through a cell selection/re-selection procedure at the time of having no connection (in RRC_IDLE, in the idle mode, during no communication) and through a handover procedure at the time of having connection (in RRC_CONNECTED, in the connected mode, during communication). A suitable cell is in general a cell that is determined that access from the terminal device is not prohibited based on information specified by the base station device and that has a downlink reception quality satisfying a prescribed condition.

In PLMN selection, the terminal device reports available PLMNs to the NAS in accordance with a request from the NAS or autonomously. During PLMN selection, a specific PLMN may be selected either automatically or manually based on a list of PLMN identities based on priority. Each PLMN in the list of PLMN identities is identified by a "PLMN identity". In system information on a broadcast channel, the terminal device can receive one or more "PLMN identities" in a certain cell. A result of the PLMN selection performed by the NAS is an identity of the selected PLMN.

In response to the request from the NAS, the AS searches for available PLMNs and reports the same to the NAS.

For the EUTRA, to find available PLMNs, the terminal device scans all the RF channels in the EUTRA operating band corresponding to the capability information on the terminal device. In each carrier (component carrier), the terminal device searches for the strongest cell and reads system information thereon to find a PLMN to which the cell belongs. In a case that the terminal device can read one or some PLMN identities in the strongest cell, each found PLMN is reported to the NAS as a PLMN having higher quality. Note that the criteria for the PLMN having higher quality include that an RSRP value measured with respect to an EUTRA cell is equal to or higher than a prescribed value (e.g., −110 dBm). Here, the strongest cell is, for example, a cell indicating the best (highest) value for measurement values such as RSRP and RSRQ. That is, the strongest cell is a cell the most preferable to communication in the terminal device.

In a case that the found PLMN does not satisfy the criteria but are readable, a PLMN identity is reported together with an RSRP value to the NAS. The measurement values reported to the NAS are the same for each PLMN found in a single cell.

The search for PLMNs may be stopped by a request from the NAS. The terminal device may optimize the PLMN search with the stored information (e.g., information on a carrier frequency and cell parameter from reception measurement control information elements, and the like).

Once the terminal device has selected a PLMN, the cell selection procedure is performed in order to select a suitable cell of the PLMN to camp on.

In a case that a CSG-ID is provided by the NAS as a part of PLMN selection, the terminal device searches for an acceptable or suitable cell belonging to the provided CSG-ID to camp on. In a case that the terminal device is no longer camped on a cell with the provided CSG-ID, the AS informs the NAS of this information.

In cell selection/re-selection, the terminal device performs measurements for the cell selection/re-selection.

The NAS can control the RAT in which the cell selection is performed, by indicating the RAT associated with the selected PLMN or by maintaining a list of forbidden registration areas and a list of equivalent PLMNs, for example. The terminal device selects a suitable cell, based on idle mode measurements and the cell selection criteria.

To accelerate the cell selection process, the information stored for some RATs may be utilized in the terminal device.

In a case of being camped on a cell, the terminal device searches for a better cell according to the cell re-selection criteria. In a case that a better cell is found, that cell is selected. The change of cell may imply a change of RAT. Here, a better cell is a cell more suitable to perform communication. For example, a better cell is a cell having higher communication quality (e.g., the cell having good results for measurement values of RSRP and RSRQ compared to other cells).

In a case that the cell selection/re-selection results in changes in the received system information on the NAS, the NAS is informed of this information.

For a normal service, the terminal device camps on a suitable cell and tunes to the control channel of the cell. This allows the terminal device to receive the system information from the PLMN. Furthermore, the terminal device can receive, from the PLMN, registration area information such as tracking area information. Furthermore, the terminal device can receive other AS and NAS information. In a case of being registered, the terminal device can receive paging and notification messages from the PLMN. Moreover, the terminal device can initiate transition to the connected mode.

The terminal device uses one of the two cell selection procedures. Initial cell selection requires no prior knowledge (stored information) that an RF channel is an EUTRA carrier. To find a suitable cell, the terminal device scans all RF channels in the EUTRA operating bands in accordance with the capability information on the terminal device. On each carrier frequency, the terminal device needs to only search for the strongest cell. Once a suitable cell is found, the cell is selected.

Stored information cell selection requires stored information on carrier frequency from previously received measurement control information elements or from previously detected cells, and optionally further requires information on a cell parameter. Once the terminal device has found a suitable cell, the terminal device selects the cell. In a case that no suitable cell is found, the initial cell selection procedure is started.

In addition to normal cell selection, manual selection of CSGs is supported by the terminal device in response to a request from higher layers.

Absolute priorities of different EUTRAN frequencies or inter-RAT frequencies may be provided to the terminal device in the system information (e.g., an RRC connection release message), or by inheriting from another RAT at inter-RAT cell (re)selection. In a case of system information, an EUTRAN frequency or inter-RAT frequency is listed without providing a priority.

In a case that priorities are provided in dedicated signalling, the terminal device ignores all the priorities provided in the system information. In a case that the terminal device is in a state of being camped on any cell, the terminal device only applies the priorities provided from a current cell (currently connected cell) in the system information. The terminal device preserves the priorities provided by the dedicated signalling or RRC connection release message, unless otherwise specified.

The terminal device in the idle mode can acquire a cell ID of the cell by performing time-frequency synchronization with the cell through the PSS/SSS and decoding the PSS/SSS. The frequency position of the CRS is estimated from the cell ID to allow the RSRP/RSRQ measurement to be performed.

Note that the EUTRAN measurement includes the measurement performed by the terminal device in the connected mode. The terminal device performs the EUTRAN measurement in the appropriate measurement gap to synchronize with a cell having performed the EUTRAN measurement. The EUTRAN measurement includes the intra-frequency RSRP/RSRQ measurement, the inter-frequency RSRP/RSRQ measurement, the measurement of the time difference in reception and transmission of the terminal device, the measurement of the time difference relating to the reference signal used to position the terminal device (RSTD), the inter-RAT (EUTRAN-GERAN/UTRAN) measurement, the inter-system (EUTRAN-non-3GPP RAT) measurement, and the like. The EUTRAN measurement is defined as physical layer measurement. The EUTRAN measurement is used to support mobility.

The terminal device in the idle mode and in the connected mode performs a cell search to acquire the time and frequency synchronization with the cell to detect the PCI of the cell. An EUTRA cell search supports an extendable transmission bandwidth corresponding to 6 or more resource blocks.

To allow a cell search to be performed, the PSS/SSS is transmitted on the downlink. That is, the terminal device performs a cell search using the PSS/SSS. The terminal device assumes that the PSS/SSS at antenna ports 0 to 3 and the PSS/SSS at the serving cell have a Quasi Co-Location (QCL) relationship against a Doppler shift and an average delay.

Adjacent cell searches are performed as initial cell searches based on the same downlink signal.

The RSRP measurement is performed based on the CRS or the CSI-RS for the configured Discovery Signal (DS).

In a case that the terminal device in a camped normally state has an individual priority other than the one for the current frequency, the terminal device consider the current frequency to be the lowest priority frequency (i.e., lower than any of the eight network configured values).

While the terminal device is camped on a suitable CSG cell, the terminal device always considers the current frequency to be the highest priority frequency (i.e., higher than any of the eight network configured values) irrespective of any other priority values allocated to the current frequency.

In a case that the terminal device enters the RRC_CONNECTED state, a timer (T320) for the optional validity time of dedicated priorities expires, or the PLMN selection is performed on request by the NAS, the terminal device deletes the priorities provided by the dedicated signalling.

The terminal device only performs cell re-selection evaluation for EUTRAN frequencies or inter-RAT frequencies that are given in the system information and for which the terminal device has a priority provided.

The terminal device does not consider any blacklisted cell as a candidate for cell re-selection.

The terminal device inherits the priorities provided by the dedicated signalling and the remaining validity time.

In a case that the terminal device supports manual CSG selection, to search for available CSGs in response to a request from the NAS, the AS scans all RF channels in the EUTRA operating bands corresponding to the capability information. On each carrier, the terminal device searches at least for the strongest cell, reads the system information thereof, and reports, to the NAS, an available CSG-ID together with the PLMN and a "Home Node B (HNB) name" (if broadcast).

In a case that the NAS has selected a CSG and provided this selection to the AS, the terminal device searches for an acceptable or suitable cell satisfying a condition for belonging to the selected CSG to camp on.

In addition to normal cell re-selection, in a case that at least one CSG-ID associated with a PLMN identity is included in a CSG whitelist of the terminal device, the terminal device may use, in accordance with performance requirements, an autonomous search function to detect at least previously visited (accessed) CSG member cells on non-serving frequencies, including inter-RAT frequencies. To search for cells, the terminal device may further use an autonomous search function on the serving frequency. In a case that the CSG whitelist of the terminal device is empty, the terminal device disables the autonomous search function for CSG cells. Here, the autonomous search function, per terminal device implementation, determines when and where to search for CSG member cells.

In a case that the terminal device detects one or more suitable CSG cells on different frequencies and the concerned CSG cell is the highest ranked cell on that frequency, the terminal device re-selects one of the detected cells irrespective of the frequency priority of the cell the terminal device is currently camped on.

In a case that the terminal device detects a suitable CSG cell on the same frequency, the terminal device re-selects this cell in accordance with the normal cell re-selection rule.

In a case that the terminal device detects one or more CSG cells on another RAT, the terminal device re-selects one of those cells in accordance with a specific rule.

While camped on a suitable CSG cell, the terminal device applies the normal cell re-selection.

To search for suitable CSG cells on non-serving frequencies, the terminal device may use the autonomous search function. In a case that the terminal device detects a CSG cell on a non-serving frequency, the terminal device may re-select the detected CSG cell in a case that the detected CSG cell is the highest ranked cell on the frequency.

In a case that the terminal device detects one or more CSG cells on another RAT, the terminal device may re-select one of those CSG cells in a case of being allowed in accordance with a specific rule.

In addition to normal cell re-selection rules, the terminal device uses the autonomous search function to detect at least previously visited hybrid cells whose CSG ID and associated PLMN identity is in the CSG whitelist in accordance with the performance requirements. The terminal device treats the detected hybrid cells as CSG cells in a case that the CSG-ID and associated PLMN identity of the hybrid cell are in the CSG whitelist and as normal cells otherwise.

In the camped normally state, the terminal device performs the following tasks (B1) to (B4).

(B1) The terminal device selects and monitors the indicated paging channel of the cell in accordance with the information transmitted in the system information.

(B2) The terminal device monitors associated system information.

(B3) The terminal device performs necessary measurements for the cell re-selection evaluation procedure.

(B4) The terminal device performs the cell re-selection evaluation procedure in response to an internal trigger of the terminal device and/or in a case that information on the Broadcast Control Channel (BCCH) used for the cell re-selection evaluation procedure is modified.

After transition from the connected mode to the idle mode, in a case that information on a redirected carrier (redirectedCarrierInfo) is included in an RRC connection release message, the terminal device attempts to camp on a suitable cell in accordance with the information. In a case that the terminal device fails to find a suitable cell, the terminal device is allowed to camp on any suitable cell of the indicated RAT. In a case that the RRC connection release message does not include the information on a redirected carrier, the terminal device attempts to select a suitable cell on the EUTRA carrier. In a case that no suitable cell is found, the terminal device starts cell selection with the stored information cell selection procedure to search for a suitable cell to camp on.

After the terminal device makes transition to a connected mode from a state of being camped on any of the cells, and then is re-adjusted to an idle mode, in a case that the information relating to a redirected carrier is included in the RRC connection release message, the terminal device attempts to camp on an acceptable cell in accordance with the information on a redirected carrier. In a case that the RRC connection release message does not include the information on a redirected carrier, the terminal device attempts to select an acceptable cell on the EUTRA carrier. In a case that the terminal device fails to find an acceptable cell, the terminal device continues to search for an acceptable cell of any PLMN, in any cell selection state. In any cell selection state, the terminal device not camping on any cell stay in this state until an acceptable cell is found.

In a state of camping on any cell, the terminal device performs the following tasks (C1) to (C6).

(C1) In accordance with the information transmitted in the system information, the terminal device selects and monitors the indicated paging channel of the cell.

(C2) The terminal device monitors associated system information.

(C3) The terminal device performs necessary measurements for the cell re-selection evaluation procedure.

(C4) The terminal device performs the cell re-selection evaluation procedure in response to an internal trigger of the terminal device and/or in a case that information on the BCCH used for the cell re-selection evaluation procedure is modified.

(C5) The terminal device regularly tries all the frequencies of all RATs supported by the terminal device to find a suitable cell. In a case that a suitable cell is found, the terminal device makes transition to the camped normally state.

(C6) In a case that the terminal device supports a voice service and that the current cell does not support an emergency call as indicated by the system information and that no suitable cell is found, the terminal device performs cell selection/re-selection to an acceptable cell of any supported RAT, regardless of the priorities provided from the current cell in the system information.

To avoid camping on a cell not capable of starting an IP Multimedia Subsystem (IMS) emergency call, the terminal device allows omission of re-selection of an EUTRAN cell on the frequency.

The terminal device camps on a cell after performing PLMN selection and cell selection, and thus, the terminal device becomes capable of receiving paging information and system information such as an MIB and SIB 1, irrespective of the state of the terminal device (RRC idle (idle mode), RRC connection (connected mode)). By performing random access, an RRC connection request can be transmitted.

In the random access procedure in the terminal device in the idle mode, higher layers (L2/L3) indicate random access preamble transmission. A physical layer (L1) transmits, in accordance with the indication, random access preamble. In a case of ACK in the L1, a random access response is received from the base station device. In a case that the L2/L3 receives the instruction from the L1, the L2/L3 indications the L1 to transmit an RRC connection request. The terminal device transmits, to the base station device (cell on which the terminal device is camped, EUTRAN, PLMN), an RRC connection request (PUSCH corresponding to a UL-SCH to which an RRC message associated with the RRC connection request is mapped). In a case of receiving the RRC connection request, the base station device transmits, to the terminal device, an RRC connection setup (PDCCH and PDSCH associated with a DL-SCH to which an RRC message associated with the RRC connection set-up is mapped). In a case of receiving the RRC connection setup on the L2/L3, the terminal device enters the connected mode. The L2/L3 of the terminal device instruct the L1 to transmit an RRC connection setup complete, and the procedure ends. The L1 transmits, to the base station device, the RRC connection setup complete (PUSCH corresponding to a UL-SCH to which an RRC message associated with the RRC connection set-up completion is mapped).

To reduce power consumption, the terminal device in the idle mode may receive a paging message by using Discontinuous Reception (DRX). A Paging Occasion (PO) is a subframe including a P-RNTI, in which a PDCCH to address to a paging message is transmitted. A Paging Frame (PF) is a radio frame including one or multiple POs. In a case that DRX is used, the terminal device needs to monitor one PO at every DRX cycle. The PO and PF are determined by using a DRX parameter provided in the system information. In a case that a value of the DRX parameter has been changed in the system information, a DRX parameter stored in the terminal device is updated locally. In a case that the terminal device does not have an International Mobile Subscriber Identity (IMSI), the terminal device uses a default identity (UE_ID=0) and i_s in the PF to perform an emergency call without a Universal Subscriber Identity Module (USIM). That is, the paging information (PCH) is notified by using a PDCCH in a prescribed subframe of a prescribed radio frame.

The terminal device camping on the cell acquires the time-frequency synchronization from the PSS/SSS to acquire the PCI. The terminal device then detects the MIB in the PBCH to acquire the carrier frequency and the downlink transmission bandwidth, the SFN, the PHICH configuration, and the like. By acquiring the MIB, the terminal device can monitor the PDCCH mapped to the whole downlink transmission bandwidth. In a case that the received PDCCH involves the CRC scrambled with the SI-RNTI, the terminal device acquires an SI message such as SIB 1 from the PDSCH corresponding to the PDCCH. Acquiring such an SI message allows acquisition of information on the configuration of the physical channels/physical signals and information on cell selection, and the like. In addition, in a case that the received PDCCH involves the CRC scrambled with the P-RNTI, the terminal device can detect the PCH in the PDSCH corresponding to the PDCCH to acquire paging information. In a case of transition from the idle mode to the connected mode, the terminal device performs initial accesses in accordance with the random access procedure. Performing the initial accesses allows the base station device to acquire information on the terminal device. In a case that the initial accesses are completed, the terminal device and the base station device can establish an RRC connection. In a case that the RRC connection is established, the terminal device makes transition to the connected mode. Moreover, in a case of being enabled to monitor the PDCCH, the terminal device periodically checks whether the terminal device is in or out of synchronization using the PDCCH. In a case of determining that the terminal device is out of synchronization, the terminal device notifies the higher layers of the determination of out of synchronization. The higher layers receive the notification, and determines that a Radio Link Failure (RLF) has occurred in the cell.

The terminal device and the base station device may employ a technique for aggregating the frequencies (component carriers or frequency band) of multiple different frequency bands through carrier aggregation and treating the resultant as a single frequency (frequency band). A component carrier includes an uplink component carrier corresponding to the uplink (uplink cell) and a downlink component carrier corresponding to the downlink (downlink cell). In each embodiment of the present invention, "frequency" and "frequency band" may be used as synonyms.

For example, in a case that five component carriers each having a frequency bandwidth of 20 MHz are aggregated through carrier aggregation, a terminal device capable of carrier aggregation performs transmission and/or reception by assuming that the aggregated carriers have a frequency bandwidth of 100 MHz. Note that component carriers to be aggregated may have contiguous frequencies or completely or partially discontiguous frequencies. For example, assuming that available frequency bands are a band of 800 MHz, a band of 2 GHz, and a band of 3.5 GHz, a component carrier may be transmitted in a band of 800 MHz, another component carrier may be transmitted in a band of 2 GHz, and yet another component carrier may be transmitted in a band of 3.5 GHz.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal device, and the frequency bandwidths of component carriers to be aggregated may be different from each other. Each frequency bandwidth is preferably equal to any of the frequency bandwidths of cells in the related art in consideration of backward compatibility but may be a frequency bandwidth different from any of the frequency bands of cells in the related art.

Moreover, component carriers (carrier types) without backward compatibility may be aggregated. Note that the number of uplink component carriers to be allocated to (configured for or added for) the terminal device by the base station device is preferably the same as or fewer than the number of downlink component carriers.

A cell constituted by an uplink component carrier in which an uplink control channel is configured for a radio resource request and a downlink component carrier having a cell-specific connection with the uplink component carrier is referred to as "PCell". A cell constituted by component carriers other than those of the PCell is referred to as "SCell". The terminal device receives a paging message, detects update of broadcast information, carries out an initial access procedure, configures security information, and the like in a PCell, and need not perform these operations in SCells.

Although a PCell is not a target of Activation and Deactivation controls (in other words, considered as being activated at any time), an SCell has activated and deactivated states, the change of which is explicitly specified by the base station device or is made based on a timer configured in the terminal device for each component carrier. A PCell and an SCell are collectively referred to as "serving cell".

Carrier aggregation is communication using multiple component carriers (frequency bands) by multiple cells and is also referred to as "cell aggregation". The terminal device may have radio connection (RRC connection) with the base station device via a relay station device (or repeater) for each frequency. In other words, the base station device according to the present embodiment may be replaced with a relay station device.

The base station device manages a cell, which is an area where terminal devices can communicate with the base station device, for each frequency. A single base station device may manage multiple cells. Cells are classified into multiple types of cells depending on the sizes of the areas (cell size) that allow for communication with terminal devices. For example, cells are classified into macro cells and small cells. Moreover, small cells are classified into femto cells, pico cells, and nano cells depending on the sizes of the areas. In a case that a terminal device can communicate with a certain base station device, the cell configured so as to be used for the communication with the terminal device is referred to as "serving cell" while the other cells not used for the communication are referred to as "neighboring cell", among the cells of the base station device.

In other words, in carrier aggregation, multiple serving cells thus configured include one PCell and one or more SCells.

The PCell is a serving cell in which an initial connection establishment procedure (RRC Connection establishment procedure) has been performed, a serving cell in which a connection re-establishment procedure (RRC Connection reestablishment procedure) has been started, or a cell indicated as a PCell in a handover procedure. The PCell operates at a primary frequency. At the point in time when a connection is (re)established, or later, an SCell may be configured. Each SCell operates at a secondary frequency. The connection may be referred to as "RRC connection". For the terminal device supporting CA, a single PCell and one or more SCells may be aggregated.

In a case that the terminal device is configured with more than one serving cell or with a secondary cell group, the terminal device holds, for each serving cell, in response to decoding failure of code blocks of the transport block for at least a prescribed number of transport blocks, received soft channel bit corresponding to at least a prescribed range.

The LAA terminal may support functions corresponding to two or more radio access technologies (RATs).

The LAA terminal supports two or more operating bands. That is, the LAA terminal supports a function relating to carrier aggregation.

Furthermore, the LAA terminal may support Time Division Duplex (TDD) and Half Duplex Frequency Division Duplex (HD-FDD). Moreover, the LAA terminal may support Full Duplex FDD (FD-FDD). The LAA terminal may indicate which duplex mode/frame structure type is supported, via higher layer signalling such as capability information.

Moreover, the LAA terminal may be an LTE terminal of category X (X is a prescribed value). That is, for the LAA terminal, the maximum bit number of transport blocks transmittable/receivable in a single Transmission Time Interval (TTI) may be extended. In the LTE, one TTI corresponds to one subframe.

Note that in each embodiment of the present invention, "TTI" and "subframe" may be synonymous.

Furthermore, the LAA terminal may support multiple duplex modes/frame structure types.

Frame structure type 1 can be applied to both FD-FDD and HD-FDD. In the FDD, 10 subframes can be utilized for each of downlink transmission and uplink transmission at every 10-ms interval. Moreover, the uplink transmission and the downlink transmission are separated in the frequency domain. In an HD-FDD operation, the terminal device fails to perform transmission and reception at the same time; however, in an FD-FDD operation, there is no such limitation.

The retuning time (the time needed for tuning (the number of subframes or symbols)) at the time at which frequency hopping or frequency for use has been changed may be configured by higher layer signalling.

For example, in the LAA terminal, the number of downlink transmission modes (PDSCH transmission modes) to be supported may be reduced. That is, in a case that the number of downlink transmission modes or a downlink transmission mode supported by the LAA terminal is indicated as the capability information from the LAA terminal, the base station device configures, based on the capability information, the downlink transmission mode. Note that in a case that a parameter for a downlink transmission mode not supported by the LAA terminal is configured, the LAA terminal may ignore the configuration. That is, the LAA terminal need not perform processing for the downlink transmission mode that is not supported. Here, the downlink transmission mode is used to indicate a transmission scheme of the PDSCH corresponding to the PDCCH/EPDCCH, based on a configured downlink transmission mode, the types of RNTI, a DCI format, and a search space. The terminal device knows, based on such pieces of information, whether the PDSCH is transmitted through antenna port 0, transmitted through the transmit diversity scheme, transmitted through multiple antenna ports, or the like. The terminal device can properly perform a reception process, based on the pieces of information. Even in a case that DCI on PDSCH resource allocation is detected from the same type of DCI format, in a case that the downlink transmission mode or the type of RNTI is different, the PDSCH is not always transmitted through the same transmission scheme.

In a case that the terminal device supports a function relating to simultaneous transmission of a PUCCH and a PUSCH and that the terminal device supports a function relating to repeated transmission of a PUSCH and/or repeated transmission of a PUCCH, the PUCCH and the PUSCH may be transmitted repeatedly by a prescribed number of times, at a timing when the PUSCH transmission occurs or at a timing when the PUCCH transmission occurs. That is, the PUCCH and the PUSCH are transmitted at the same time (i.e., in the same subframe).

In such a case, the PUCCH may include a CSI report, an HARQ-ACK, and an SR.

All signals can be transmitted and/or received in a PCell, but some signals may be unable to be transmitted and/or received in an SCell. For example, a PUCCH is transmitted only in a PCell. Additionally, unless multiple Timing Advance Groups (TAGs) are configured for both the cells, a PRACH is transmitted only in a PCell. Additionally, a PBCH is transmitted only in a PCell. Additionally, a Master Information Block (MIB) is transmitted only in a PCell. However, in a case that a terminal device supports a function of transmitting a PUCCH and an MIB in an SCell, a base station device may instruct the terminal device to transmit a PUCCH and an MIB in an SCell (at a frequency corresponding to the SCell). That is, in a case that a terminal device supports the function, a base station device may configure, to the terminal device, a parameter for transmitting a PUCCH and an MIB in an SCell.

In a PCell, a Radio Link Failure (RLF) is detected. In an SCell, even in a case that conditions for detection of an RLF are in place, the detection of the RLF is not recognized. In a lower layer of the PCell, in a case that conditions for an RLF are satisfied, the lower layer of the PCell notifies a higher layer of the PCell of the fact that the conditions for an RLF are satisfied. Semi-Persistent Scheduling (SPS) or Discontinuous Transmission (DRX) may be performed in a PCell. In an SCell, the same DRX as that in a PCell may be performed. Fundamentally, in an SCell, MAC configuration information/parameters are shared with the PCell of the same call group. Some of the parameters (e.g., sTAG-Id) may be configured for each SCell. Some of timers or counters may be applied only to the PCell. A timer or counter applied only to the SCell may be configured.

Figure 3:
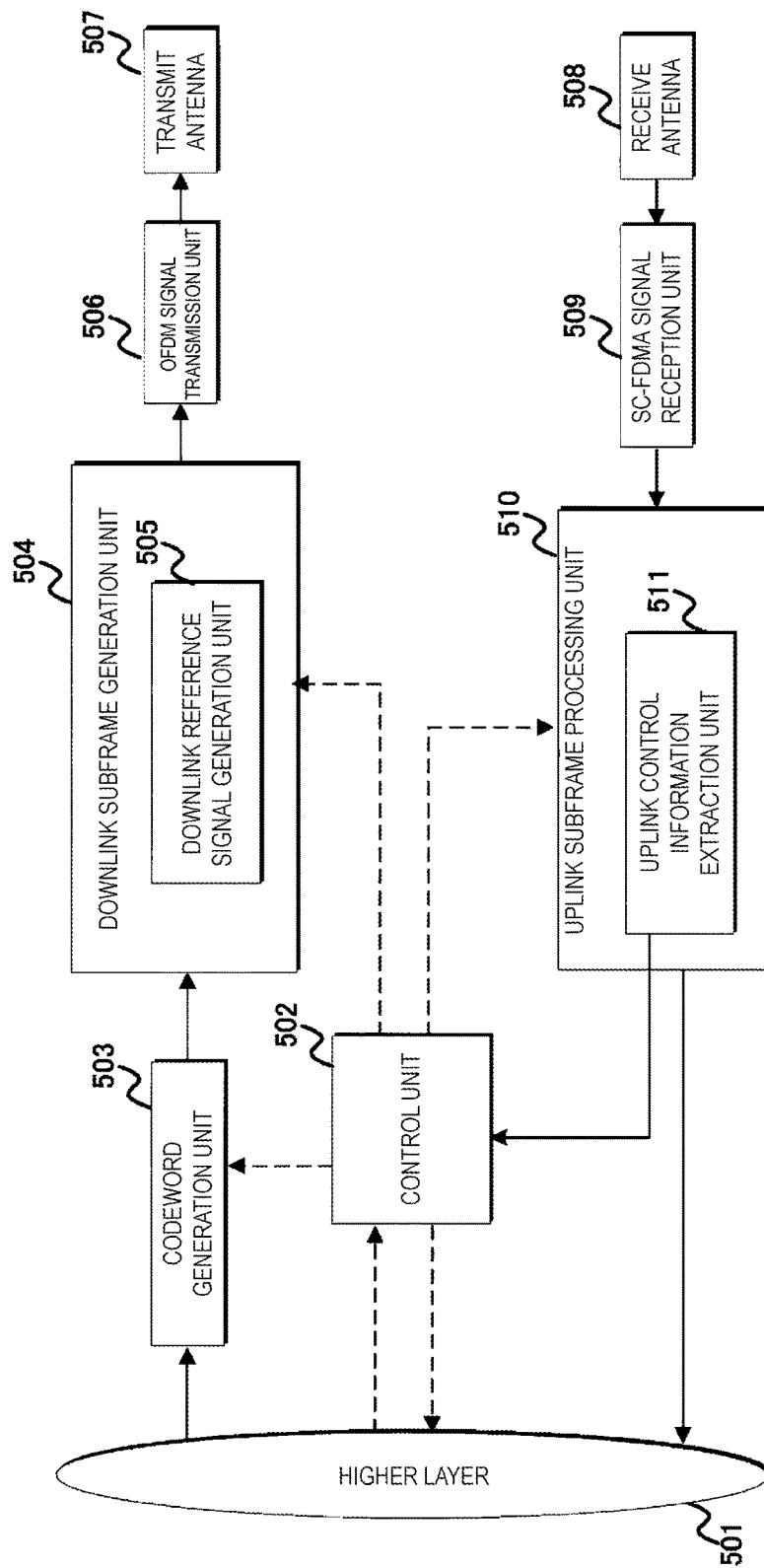
FIG. 3 is a diagram illustrating an example of a block configuration of a base station device according to the first embodiment.

FIG. 3 is a schematic diagram illustrating an example of a block configuration of a base station device 2 according to the present embodiment. The base station device 2 includes a higher layer (higher-layer control information notification unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (channel state measurement unit and/or CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit/HARQ-ACK acquisition unit/SR acquisition unit) 511. Note that the SC-FDMA signal reception unit 509 also serves as a measurement unit for receive signals, the CCA, and interference and noise power.

Figure 4:
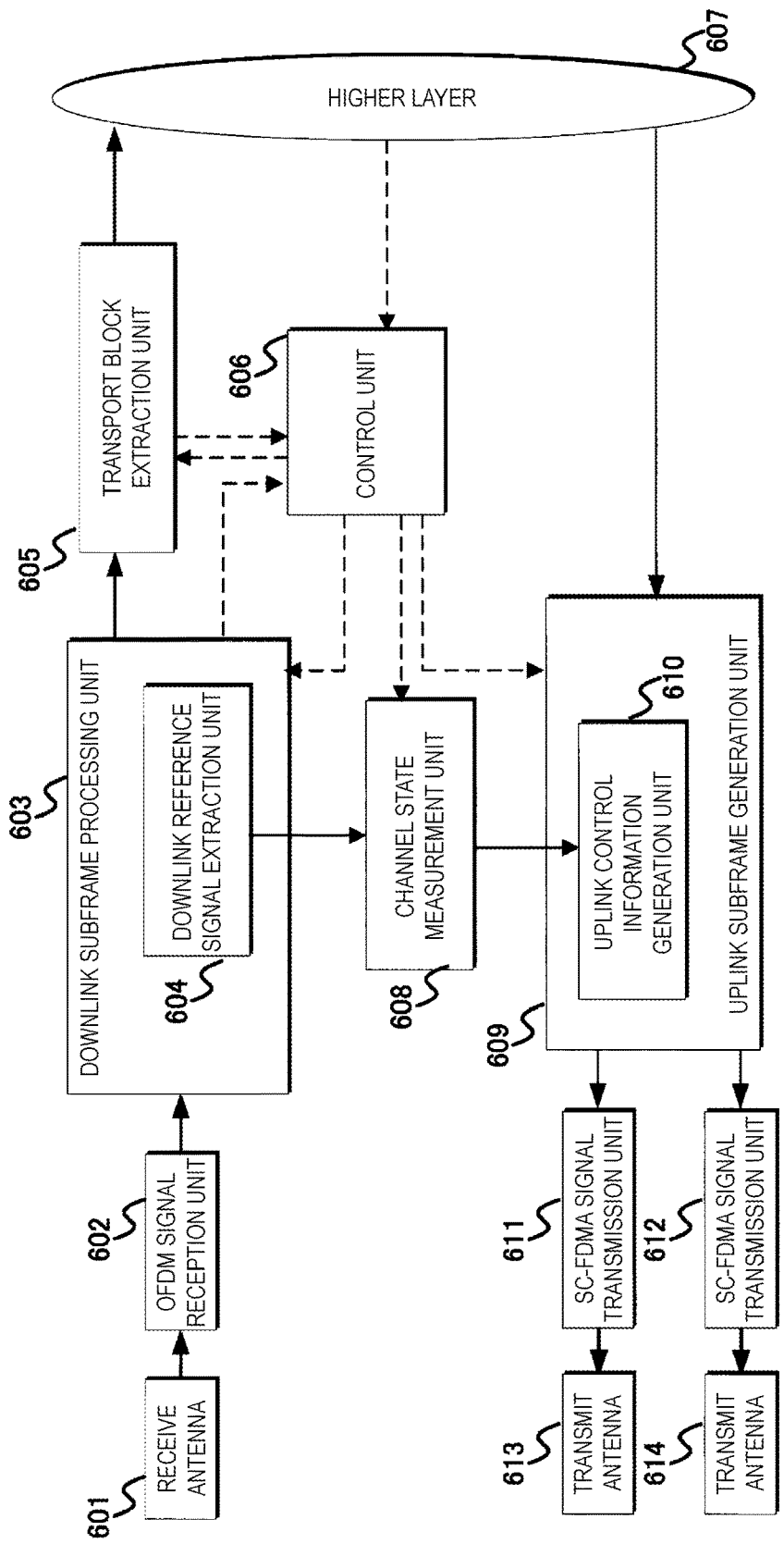
FIG. 4 is a diagram illustrating an example of a block configuration of a terminal device according to the first embodiment.

FIG. 4 is a schematic diagram illustrating an example of a block configuration of a terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink sub frame processing unit 603 includes a downlink reference signal extraction unit 604. Moreover, the uplink subframe generation unit 609 includes an uplink control information generation unit (UCI generation unit) 610. Note that the OFDM signal reception unit 602 also serves as a measurement unit for receive signals, the CCA, and interference and noise power. That is, the OFDM signal reception unit 602 may perform the RRM measurement.

In each of FIG. 3 and FIG. 4, the higher layers may include a Medium Access Control (MAC) layer, a Radio Link Control (RLC) layer, a Packet Data Convergence Protocol (PDCP) layer, and a Radio Resource Control (RRC) layer.

The RLC layer performs, to any of the higher layers, Transparent Mode (TM) data transmission, Unacknowledged Mode (UM) data transmission, and Acknowledged Mode (AM) data transmission including an indication that transmission of a Packet Data Unit (PDU) from the higher layer has been successful. Moreover, the RLC layer performs data transmission to the lower layer and notifies the lower layer of a transmission opportunity along with the total size of RLC PDUs transmitted at the transmission opportunity.

The RLC layer supports a function relating to transmission of PDUs from the higher layer, a function relating to error correction via an Automatic Repeat reQuest (ARQ) (only for AM data transmission), a function relating to combination/division/re-construction of RLC Service Data Units (SDUs) (only for UM and AM data transmission), a function relating to re-division of RLC data PDUs (for AM data transmission), a function relating to rearrangement of RLC data PDUs (only for AM data transmission), a function relating to overlap detection (only for UM and AM data transmission), a function relating to discarding of RLC SDUs (only for UM and AM data transmission), a function relating to re-establishment of the RLC, and a function relating to protocol error detection (only for AM data transmission).

First, a flow of downlink data transmission and/or reception will be described with reference to FIG. 3 and FIG. 4. In the base station device 2, the control unit 502 holds a Modulation and Coding Scheme (MCS) indicating a modulation scheme, a coding rate, and the like in the downlink, downlink resource allocation indicating RBs to be used for data transmission, and information to be used for HARQ control (redundancy version, HARQ process number, new data indicator) and controls the codeword generation unit 503 and downlink subframe generation unit 504 based on these elements. Downlink data (also referred to as "downlink transport block", "DL-SCH data", and "DL-SCH transport block") transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped to REs of some RBs, and a downlink subframe for each antenna port is generated through a precoding process. In this operation, the transmission data sequence transmitted from the higher layer 501 includes higher-layer control information, which is control information on the higher layer (e.g., dedicated (individual) Radio Resource Control (RRC) signalling). Moreover, in the downlink reference signal generation unit 505, a downlink reference signal is generated. The downlink subframe generation unit 504 maps the downlink reference signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed in a case that downlink subframes are transmitted on multiple antenna ports. Moreover, the downlink subframe generation unit 504 may also have the capability of generating physical-layer downlink control channels, such as a PDCCH and an EPDCCH to map the channels to REs in downlink subframes. Multiple base station devices each transmit separate downlink subframes.

In the terminal device 1, an OFDM signal is received by the OFDM signal reception unit 602 via the receive antenna 601, and an OFDM demodulation process is performed on the signal.

The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 603 monitors a PDCCH and an EPDCCH. In a case that the CRC bits match an ID (single terminal-specific identifier (UEID) assigned to a single terminal, such as a Cell-Radio Network Temporary Identifier (C-RNTI) or a Semi-Persistent Scheduling-C-RNTI (SPS-C-RNTI), or a Temporaly C-RNTI) assigned by the base station device in advance, the downlink subframe processing unit 603 recognizes that a PDCCH or an EPDCCH has been detected and extracts a PDSCH by using control information included in the detected PDCCH or EPDCCH.

The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the control unit 606 performs control so as to carry out an RE demapping process, a demodulation process, and the like corresponding to an RE mapping process and a modulation process in the downlink subframe generation unit 504. The PDSCH extracted from the received downlink subframe is transmitted to the transport block extraction unit 605. Furthermore, the downlink reference signal extraction unit 604 in the downlink subframe processing unit 603 extracts the DLRS from the downlink subframe.

In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes higher-layer control information, and the higher layer 607 notifies the control unit 606 of a necessary physical-layer parameter based on the higher-layer control information. The multiple base station devices 2 each transmit separate downlink subframes, and the terminal device 1 receives the downlink subframes. Hence, the above-described processes may be performed for the downlink subframe of each of the multiple base station devices 2. In this case, the terminal device 1 may recognize that multiple downlink subframes have been transmitted from the multiple base station devices 2, or need not recognize this. In a case that the terminal device 1 does not recognize the above, the terminal device 1 may simply recognize that multiple downlinks subframes have been transmitted from multiple cells. Moreover, the transport block extraction unit 605 determines whether the transport block has been detected correctly and transmits the determination result to the control unit 606.

Here, the transport block extraction unit 605 may include a buffer portion (soft buffer portion). In the buffer portion, information on the extracted transport block can be stored temporarily. For example, in a case that the same transport block (retransmitted transport block) is received, in a case that decoding of data for this transport block is not succeeded, the transport block extraction unit 605 combines (composes) newly received data and the data for this transport block temporarily stored in the buffer portion, and attempts to decode the combined data. In a case that the temporarily-stored data becomes unnecessary or that a prescribed condition is satisfied, the buffer portion flushes the data. A condition for data to be flushed differs depending on the type of transport block corresponding to the data. The buffer portion may be prepared for each data type. For example, as the buffer portion, a message-3 buffer or an HARQ buffer may be prepared, or a buffer portion may be prepared for each layer, L1/L2/L3 and the like. Note that "flushing information/data" includes "flushing a buffer in which information and data are stored".

Next, a flow of uplink signal transmission and/or reception will be described. In the terminal device 1, a downlink reference signal extracted by the downlink reference signal extraction unit 604 is transmitted to the channel state measurement unit 608 under the instruction from the control unit 606, the channel state and/or interference is measured in the channel state measurement unit 608, and further CSI is calculated based on the measured channel state and/or interference. The control unit 606 instructs the uplink control information generation unit 610 to generate an HARQ-ACK (DTX (not transmitted yet), ACK (detection succeeded), or NACK (detection failed)) and to map the HARQ-ACK to a downlink subframe based on the determination result whether the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to RBs in an uplink subframe, and an uplink subframe is generated.

An SC-FDMA signal is received by the SC-FDMA signal reception unit 509 via the receive antenna 508, and an SC-FDMA demodulation process is performed on the signal. In the uplink subframe processing unit 510, RBs to which the PUCCH is mapped are extracted by an instruction from the control unit 502, and, in the uplink control information extraction unit 511, the CSI included in the PUCCH is extracted. The extracted CSI is transmitted to the control unit 502. The CSI is used for control of downlink transmission parameters (MCS, downlink resource allocation, HARQ, and the like) by the control unit 502.

The base station device assumes maximum output power $P_{CMAX}$ configured by the terminal device from a power headroom report, and based on the physical uplink channel received from the terminal device, assumes an upper limit value of the power for each physical uplink channel. The base station device determines, based on these assumptions, a transmit power control command value for a physical uplink channel, and transmits the value to the terminal device on a PDCCH involving a downlink control information format. With these operations, power adjustment for the transmit power of the physical uplink channel transmitted from the terminal device is performed.

In a case of transmitting the PDCCH (EPDCCH)/PDSCH to the terminal device, the base station device performs resource allocation of the PDCCH/PDSCH in such a manner as to avoid allocation to a PBCH resource.

The PDSCH may be used to transmit messages/information relating to each of the SIB/RAR/paging/unicast for the terminal device.

Frequency hopping for the PUSCH may be individually configured according to the type of grant. For example, parameter values used for frequency hopping for the PUSCH corresponding to dynamic schedule grant, semi-persistent grant, and RAR grant may be individually configured. The parameters may not be represented using uplink grant. Moreover, the parameters may be configured via higher layer signalling including system information.

The above-described various parameters may be configured for each physical channel. Moreover, the above-described various parameters may be configured for each terminal device. Moreover, the above-described various parameters may be configured commonly among the terminal devices. Here, the above-described various parameters may be configured using system information. Moreover, the above-described various parameters may be configured using higher layer signalling (RRC signalling or MAC CE). Moreover, the above-described various parameters may be configured using the PDCCH/EPDCCH. The above-described various parameters may be configured as broadcast information. Moreover, the above-described various parameters may be configured as unicast information.

Note that, in the above-described embodiments, the power value required by each PUSCH transmission is described as being calculated based on the parameters configured by a higher layer, an adjustment value determined based on the number of PRBs allocated to the PUSCH transmission by resource assignment, downlink path loss and a coefficient by which the path loss is multiplied, an adjustment value determined based on the parameter indicating the offset of the MCS applied to UCI, a value based on a TPC command, and the like. Moreover, the description is provided that the power value required by each PUCCH transmission is calculated based on the parameter configured by a higher layer, downlink path loss, an adjustment value determined based on the UCI transmitted by the PUCCH, an adjustment value determined based on the PUCCH format, an adjustment value determined based on the antenna port number used for the PUCCH transmission, the value based on the TPC command, and the like. However, the calculation of the power value is not limited to such a configuration. An upper limit value may be set for the required power value, and the smallest value of the value based on the above-described parameters and the upper limit value (e.g., $P_{CMAX,\,c}$, which is the maximum output power value of the serving cell c) may be used as the required power value.

A program running on each of the base station device and the terminal device according to the present invention may be a program that controls a Central Processing Unit (CPU) and the like (a program for causing a computer to operate) in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and depending on the need, is read by the CPU to be modified or rewritten.

Note that, the terminal device and/or the base station device according to the above-described embodiments may be partially realized by the computer. In this case, this configuration may be realized by recording a program for realizing such control functions on a computer-readable recording medium and causing a computer system to read the program recorded on the recording medium for execution.

Note that the "computer system" is defined as a computer system built into the terminal device or the base station device, and the computer system includes an OS and hardware such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device according to the above-described embodiments can be realized as an aggregation (device group) constituted of multiple devices. Devices constituting the device group may be each equipped with some or all portions of each function or each functional block of the base station device according to the above-described embodiments. It is only required that the device group itself includes general functions or general functional blocks of the base station device. Furthermore, the terminal device according to the above-described embodiments can also communicate with the base station device as the aggregation.

Furthermore, the base station device according to the above-described embodiments may be an Evolved Universal Terrestrial Radio Access Network (EUTRAN). Furthermore, the base station device 2 according to the above-described embodiments may have some or all portions of the function of a node higher than an eNodeB.

Furthermore, some or all portions of each of the terminal device and the base station device according to the above-described embodiments may be realized as an LSI that is a typical integrated circuit or may be realized as a chip set. The functional blocks of the terminal device and the base station device may be individually realized as a chip, or some or all of the functional blocks may be integrated into a chip. The circuit integration technique is not limited to LSI, and the integrated circuits for the functional blocks may be realized as dedicated circuits or a general-purpose processor. Furthermore, in a case that with advances in semiconductor technology, a circuit integration technology with which an LSI is replaced appears, it is also possible to use an integrated circuit based on the technology.

Furthermore, according to the above-described embodiments, a cellular mobile station device (cellular phone, portable terminal) is described as one example of a terminal device or a communication device, but the present invention is not limited to this, and can be applied to a terminal device or a communication device such as a fixed-type electronic apparatus installed indoors or outdoors, or a stationary-type electronic apparatus, e.g., an AV apparatus, a kitchen apparatus (e.g., a refrigerator or microwave oven), a cleaning or washing machine, an air-conditioning apparatus, office equipment, a vending machine, an in-vehicle machine such as a car navigation system, or any other household apparatus.

From the above, several aspects of the present invention provide the following characteristics.

(1) A terminal device according to an aspect of the present invention is a terminal device for communicating with a base station device, the terminal device including: a reception unit configured to receive a measurement object configuration including a configuration relating at least to a Received Signal Strength Indicator (RSSI) using higher layer signaling, and a reception unit configured to measure, in a case that a report configuration associated with the measurement object configuration indicates that at least a Reference Signal Received Quality (RSRQ) is to be reported, a first RSSI in Orthogonal Frequency Division Multiplexing (OFDM) symbols including a reference symbol for antenna port 0 for a Cell specific Reference Signal (CRS) based on a corresponding first measured subframe pattern, and calculate the RSRQ using the first RSSI, the reception unit identifying subframes and a measurement period in which a second RSSI is measured based on a second measured subframe pattern included in the configuration relating to the RSSI, measuring the second RSSI in each of the subframes in which the second RSSI is measured, and generating a histogram using the second RSSI measured in each of the subframes included in the measurement period and in which the second RSSI is measured.

(2) The terminal device according to an aspect of the present invention wherein, in the above-described terminal device, the configuration relating to the RSSI includes a configuration relating to at least one Channel State Information-Interference Measurement (CSI-IM) resource.

(3) The terminal device according to an aspect of the present invention wherein, in the above-described terminal device, in a case that the measurement object configuration includes a first configuration and a second configuration relating to the CSI-IM resource, the first configuration and the second configuration are listed, and include corresponding Identities (IDs), and the reception unit measures the second RSSI in each of a resource based on the first configuration and a resource based on the second configuration, and based on a condition, reports one or both of a measurement result for the resource based on the first configuration and a measurement result for the resource based on the second configuration, along with the corresponding ID.

(4) A base station device according to an aspect of the present invention is a base station device for communicating with a terminal device, the base station device including a transmission unit configured to set a configuration relating to an RSSI for a measurement object configuration, set a parameter indicating that a measurement result for Reference Signal Received Quality (RSRQ) is to be reported, for a first report configuration associated with the measurement object configuration, set a parameter indicating that a measurement result for a Received Signal Strength Indicator (RSSI) is to be reported, for a second report configuration associated with the measurement object configuration, and perform transmission using higher layer signalling, and a reception unit configured to receive a measurement result corresponding to the first report configuration and a measurement result corresponding to the second report configuration.

(5) A method according to an aspect of the present invention is a method in a terminal device communicating with a base station device, the method including the steps of receiving a measurement object configuration including a configuration relating at least to a Received Signal Strength Indicator (RSSI) using higher layer signaling, measuring, in a case that a report configuration associated with the measurement object configuration indicates that at least a Reference Signal Received Quality (RSRQ) is to be reported, a first RSSI in Orthogonal Frequency Division Multiplexing (OFDM) symbols including a reference symbol for antenna port 0 for a Cell specific Reference Signal (CRS) based on a corresponding first measured subframe pattern, calculating the RSRQ using the first RSSI, identifying subframes and a measurement period in which a second RSSI is measured based on a second measured subframe pattern included in the configuration relating to the RSSI, measuring the second RSSI in each of the subframes in which the second RSSI is measured, and generating a histogram using the second RSSI measured in each of the subframes included in the measurement period and in which the second RSSI is measured.

(6) A method according to an aspect of the present invention is a method in a base station device communicating with a terminal device, the method including the steps of setting a configuration relating to an RSSI for a measurement object configuration, setting a parameter indicating that a measurement result for Reference Signal Received Quality (RSRQ) is to be reported, for a first report configuration associated with the measurement object configuration, setting a parameter indicating that a measurement result for a Received Signal Strength Indicator (RSSI) is to be reported, for a second report configuration associated with the measurement object configuration, performing transmission using higher layer signalling, and receiving a measurement result corresponding to the first report configuration and a measurement result corresponding to the second report configuration.

(7) A terminal device according to an aspect of the present invention is a terminal device for communicating with a base station device, the terminal device including a reception unit configured to measure a first Received Signal Strength Indicator (RSSI) and a second RSSI in a case that a carrier frequency included in a measurement object configuration belongs to a prescribed operating band and a report configuration indicates at least Reference Signal Received Quality (RSRQ) is to be reported as a measurement result and periodical reporting is configured, the first RSSI being measured in all Orthogonal Frequency Division Multiplexing (OFDM) symbols in an indicated subframe, the second RSSI being measured in OFDM symbols in a subframe other than the indicated subframe, the first RSSI being used to define the RSRQ relating to a CRS, and the second RSSI being used to generate a histogram for the RSSI.

(8) The terminal device according to an aspect of the present invention wherein, in the above-described terminal device, the second RSSI is measured in OFDM symbols in the subframe other than a subframe constituting a Discovery Signal (DS) occasion based on the measurement object configuration in a case that the measurement object configuration includes a measurement DS configuration.

(9) The terminal device according to an aspect of the present invention wherein, in the above-described terminal device, the histogram indicates an occupancy time (a percentage in a time domain) of each level of the RSSI measured during a measurement period based on the reporting interval.

(10) The terminal device according to an aspect of the present invention wherein, in the above-described terminal device, the second RSSI is measured in each of the OFDM symbols.

(11) The terminal device according to an aspect of the present invention wherein, in the above-described terminal device, a resource used to measure the second RSSI is included in 6 resource blocks in a center of a bandwidth used for a Primary Synchronization Signal (PSS)/Secondary Synchronization Signal (SSS), and is not used for transmission.

(12) The terminal device according to an aspect of the present invention wherein, in the above-described terminal device, the resource used to measure the second RSSI is included in a guard band.

(13) A base station device according to an aspect of the present invention is a base station device for communicating with a terminal device, the base station device including a transmission unit configured to transmit a measurement object configuration including a carrier frequency configured to belong to a prescribed operating band and a measurement result for Reference Signal Received Quality (RSRQ) are to be reported, using higher layer signaling, and a reception unit configured to receive a measurement result for the RSRQ in a case that the prescribed operating band is a first operating band and receive a histogram corresponding to each level of a Received Signal Strength Indicator (RSSI) in a case that the prescribed operating band is a second operating band.

(14) A method according to an aspect of the present invention is a method in a terminal device for communicating with a base station device, the method including the step of measuring a first Received Signal Strength Indicator (RSSI) and a second RSSI in a case that a carrier frequency included in a measurement object configuration belongs to a prescribed operating band and a report configuration indicates at least Reference Signal Received Quality (RSRQ) is to be reported as a measurement result and periodical reporting is configured, the first RSSI being measured in all OFDM symbols in an indicated subframe and used to define the RSRQ relating to a CRS, the second RSSI being measured in OFDM symbols in a subframe other than the indicated subframe and used to generate a histogram for the RSSI.

(15) A method according to an aspect of the present invention is a method in a base station device for communicating with a terminal device, the method including the steps of transmitting a measurement object configuration including a carrier frequency configured to belong to a prescribed operating band and a measurement result for Reference Signal Received Quality (RSRQ) are to be reported, using higher layer signalling, receiving a measurement result for the RSRQ in a case that the prescribed operating band is a first operating band, and receiving a histogram corresponding to each level of a Received Signal Strength Indicator (RSSI) in a case that the prescribed operating band is a second operating band.

(16) A terminal device according to an aspect of the present invention is a terminal device for communicating with a base station device, the terminal device including a reception unit configured to determine a total number of resources for which a Received Signal Strength Indicator (RSSI) is measured and resources used to generate a histogram, based on a first configuration relating to the histogram, in a case that a measurement object configuration includes the first configuration, the reception unit classifying the RSSI in each of the resources into levels based on measurement values to generate a histogram at each level.

(17) The terminal device according to an aspect of the present invention wherein, in the above-described terminal device, the resources are based on a resource configuration and a subframe configuration relating to Channel State Information-Interference Measurement (CSI-IM).

(18) The terminal device according to an aspect of the present invention wherein, in the above-described terminal device, the resources are Orthogonal Frequency Division Multiplexing (OFDM) symbols included in a Discovery Signal (DS) occasion and in which no DS is transmitted.

(19) The terminal device according to an aspect of the present invention wherein, in the above-described terminal device, the resources are resource elements in a guard band included in a specific subframe.

(20) The terminal device according to an aspect of the present invention wherein, in the above-described terminal device, the resources are resources allocated to a Primary Synchronization Signal (PSS)/Secondary Synchronization Signal (SSS) and in which the PSS/SSS is not transmitted.

(21) A base station device according to an aspect of the present invention is a base station device for communicating with a terminal device, the base station device including a transmission unit configured to transmit a measurement object configuration including a first configuration relating to a histogram for a Received Signal Strength Indicator (RSSI), using higher layer signalling, the first configuration including at least a measurement period.

(22) The base station device according to an aspect of the present invention wherein, in the above-described base station, the transmission unit transmits a report configuration including a parameter indicating that the histogram is to be reported, using the higher layer signalling.

(23) A method according to an aspect of the present invention is a method in a terminal device for communicating a base station device, the method including the steps of determining a total number of resources for which a Received Signal Strength Indicator (RSSI) is measured and resources used to generate a histogram, based on a first configuration relating to the histogram, in a case that a measurement object configuration includes the first configuration, and classifying, by the reception unit, the RSSI in each of the resources into levels based on measurement values to generate a histogram at each level.

(24) A method according to an aspect of the present invention is a method in a base station device communicating with a terminal device, the method including the steps of transmitting a measurement object configuration including a first configuration relating to a histogram for a Received Signal Strength Indicator (RSSI), using higher layer signalling, and including at least a measurement period in the first configuration.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

INDUSTRIAL APPLICABILITY

Some aspects of the present invention can be applied to, e.g., a terminal device and a method necessary to communicate efficiently.

DESCRIPTION OF REFERENCE NUMERALS

501 Higher layer
502 Control unit
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606 Control unit
607 Higher layer
608 Channel state measurement unit
609 Uplink subframe generation unit
610 Uplink control information generation unit
611, 612 SC-FDMA signal transmission unit
613, 614 Transmit antenna

The invention claimed is:

1. A base station device comprising:
transmission circuitry configured to transmit a measurement object configuration and a report configuration by using higher layer signaling, wherein
the measurement object configuration includes a parameter associated with a measurement of an occupancy of a received signal strength indicator (RSSI),
the report configuration includes a parameter associated with a measurement reporting of the occupancy of the RSSI; and
reception circuitry configured to receive the occupancy of the RSSI only when a trigger type of the report configuration is set to periodical, wherein
the RSSI is a linear average value of a total received power observed only in an OFDM symbol and in a measurement bandwidth and includes a co-channel serving cell and non-serving cell, adjacent channel interference, and thermal noise, and
the occupancy of the RSSI indicates percentage of measurement points in a measurement period, wherein, on each of the measurement points, the RSSI is above a first threshold.

2. The base station device according to claim 1, wherein the parameter associated with the measurement reporting of the occupancy of the RSSI is configured only when a trigger type of the report configuration is set to periodical.

3. A terminal device comprising:
reception circuitry configured to receive a measurement object configuration and a report configuration by using higher layer signaling, wherein the measurement object configuration includes a parameter associated with a measurement of an occupancy of a received signal strength indicator (RSSI), the report configuration includes a parameter associated with a measurement reporting of the occupancy of the RSSI; and transmission circuitry configured to transmit the occupancy of the RSSI only when a trigger type of the report configuration is set to periodical, wherein the RSSI is a linear average value of a total received power observed only in an OFDM symbol and in a measurement bandwidth and includes a co-channel serving cell and non-serving cell, adjacent channel interference, and thermal noise, and the occupancy of the RSSI indicates percentage of measurement points in a measurement period, wherein, on each of the measurement points, the RSSI is above a first threshold.

4. The terminal device according to claim 3, wherein the parameter associated with the measurement reporting of the occupancy of the RSSI is configured only when a trigger type of the report configuration is set to periodical.

5. A communication method of a base station device comprising:

transmitting a measurement object configuration and a report configuration by using higher layer signaling, the measurement object configuration including a parameter associated with a measurement of an occupancy of a received signal strength indicator (RSSI), and the report configuration including a parameter associated with a measurement reporting of the occupancy of the RSSI; and receiving the occupancy of the RSSI only when a trigger type of the report configuration is set to periodical, wherein the RSSI is a linear average value of a total received power observed only in an OFDM symbol and in a measurement bandwidth and includes a co-channel serving cell and non-serving cell, adjacent channel interference, and thermal noise, and the occupancy of the RSSI indicates percentage of measurement points in a measurement period, wherein, on each of the measurement points, the RSSI is above a first threshold.

6. A communication method of a terminal device comprising:

receiving a measurement object configuration and a report configuration by using higher layer signaling, the measurement object configuration including a parameter associated with a measurement of an occupancy of a received signal strength indicator (RSSI), and the report configuration including a parameter associated with a measurement reporting of the occupancy of the RSSI; and transmitting the occupancy of the RSSI only when a trigger type of the report configuration is set to periodical, wherein the RSSI is a linear average value of a total received power observed only in an OFDM symbol and in a measurement bandwidth and includes a co-channel serving cell and non-serving cell, adjacent channel interference, and thermal noise, and the occupancy of the RSSI indicates percentage of measurement points in a measurement period, wherein, on each of the measurement points, the RSSI is above a first threshold.

* * * * *